(12) United States Patent
Balogh

(10) Patent No.: US 11,015,310 B2
(45) Date of Patent: May 25, 2021

(54) PEDESTRIAN BARRIER AND QUEUE MANAGEMENT

(71) Applicant: ULTINOUS Zrt., Budapest (HU)

(72) Inventor: György Balogh, Szada (HU)

(73) Assignee: ULTINOUS Zrt., Budapest (HU)

(*) Notice: Subject to any disclaimer, the term of this patent is extended or adjusted under 35 U.S.C. 154(b) by 26 days.

(21) Appl. No.: 16/528,172

(22) Filed: Jul. 31, 2019

(65) Prior Publication Data
US 2021/0032822 A1 Feb. 4, 2021

(51) Int. Cl.
*E01F 13/02* (2006.01)
*G06K 9/00* (2006.01)
*E01F 13/04* (2006.01)

(52) U.S. Cl.
CPC .......... *E01F 13/022* (2013.01); *E01F 13/048* (2013.01); *G06K 9/00362* (2013.01); *G06K 9/00778* (2013.01)

(58) Field of Classification Search
CPC .. E01F 13/022; E01F 13/048; G06K 9/00362; G06K 9/00778
USPC .............................................. 404/6, 9; 49/49
See application file for complete search history.

(56) References Cited

U.S. PATENT DOCUMENTS

| | | | | |
|---|---|---|---|---|
| 5,829,913 A | * | 11/1998 | Puckett | E01F 9/61 404/6 |
| 6,213,047 B1 | * | 4/2001 | Means | B60Q 1/2692 116/28 R |
| 7,481,598 B2 | * | 1/2009 | Jankovsky | B61L 29/04 404/6 |
| 2001/0037602 A1 | * | 11/2001 | Nickerson | E01F 13/065 49/49 |
| 2005/0023403 A1 | * | 2/2005 | Lu | E01F 13/028 242/381.5 |
| 2016/0244923 A1 | * | 8/2016 | Green | E01F 13/04 |

* cited by examiner

Primary Examiner — Raymond W Addie
(74) Attorney, Agent, or Firm — Flaster Greenberg, P.C.

(57) ABSTRACT

A queue management system comprises a plurality of dynamic pedestrian barriers, each comprising a plurality of movable barrier arms carried by a barrier post, the plurality of dynamic pedestrian barriers being arranged in a two-dimensional grid pattern over a queuing area; and a controller configured to control the movable barrier arms of the dynamic pedestrian barriers to be reconfigurable between at least a first configuration, in which the plurality of dynamic pedestrian barriers define a first queue path between a queue entry and a queue exit, and a second configuration, in which the plurality of dynamic pedestrian barriers define a second queue path between the queue entry and the queue exit, the second queue path having a different path length.

23 Claims, 11 Drawing Sheets

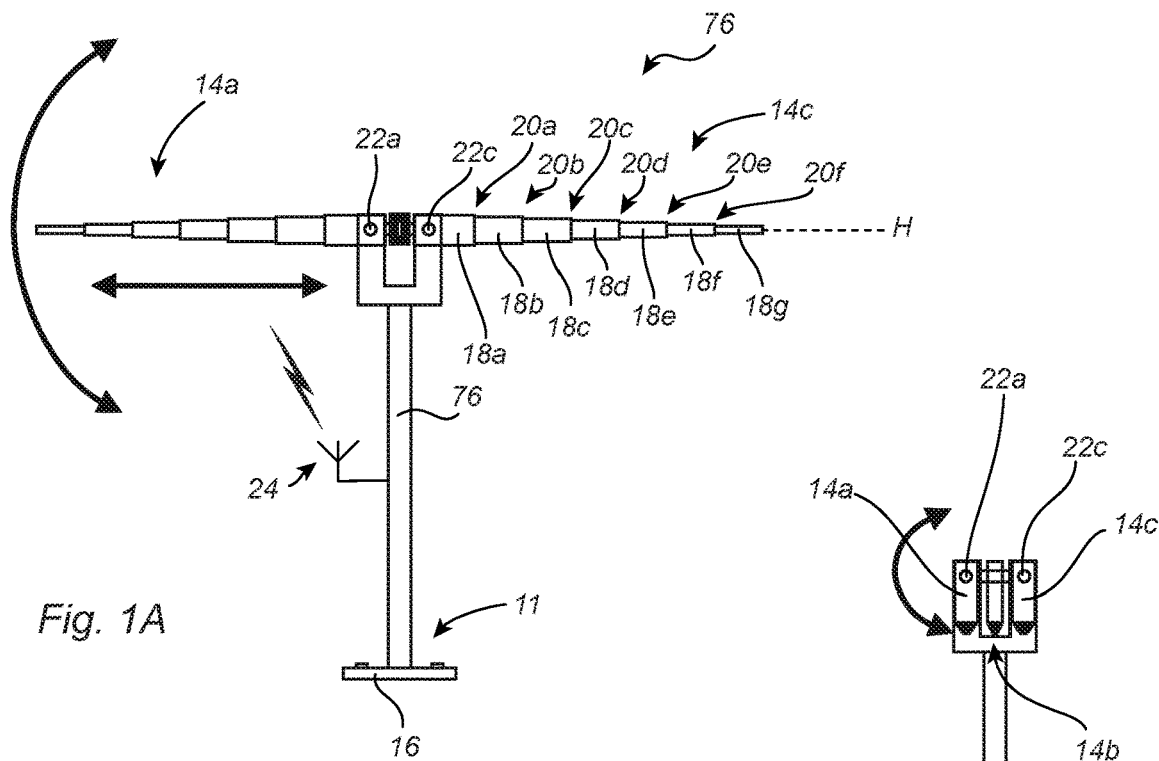
Fig. 1A
Fig. 1C
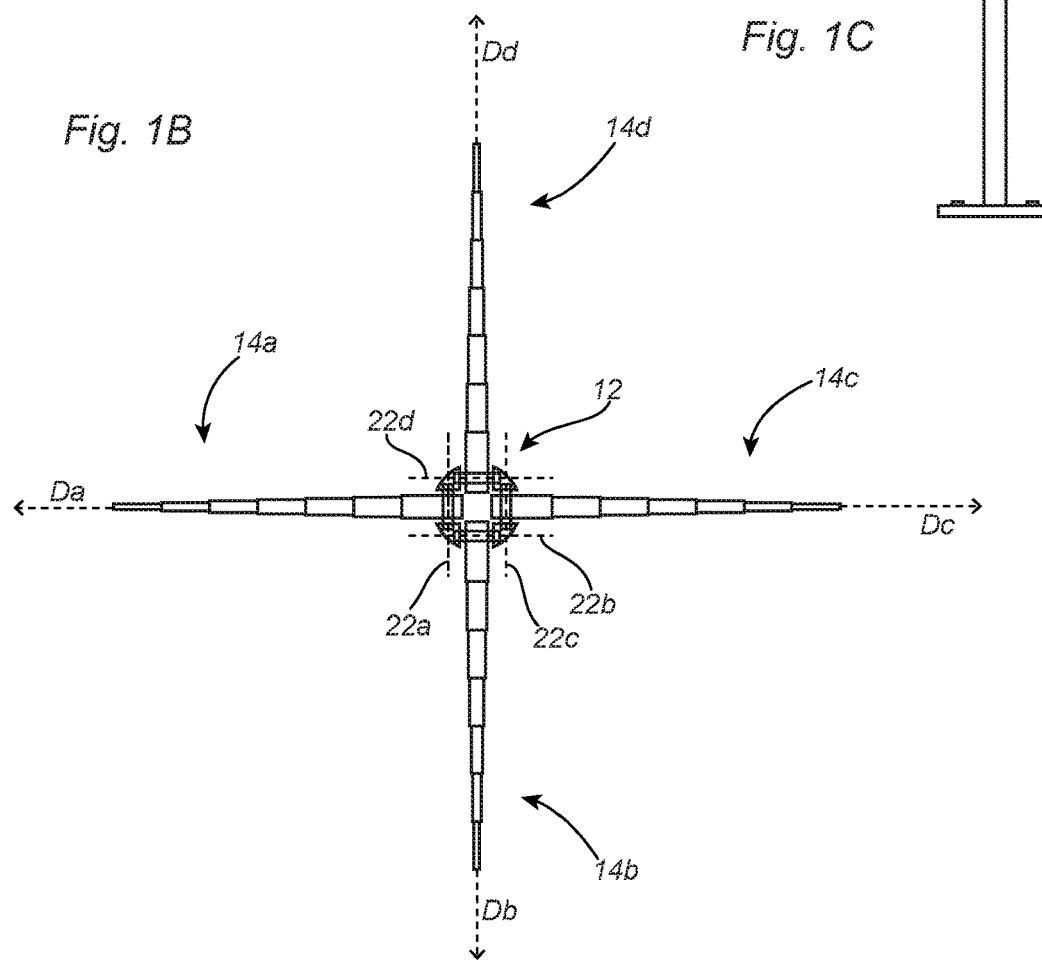
Fig. 1B

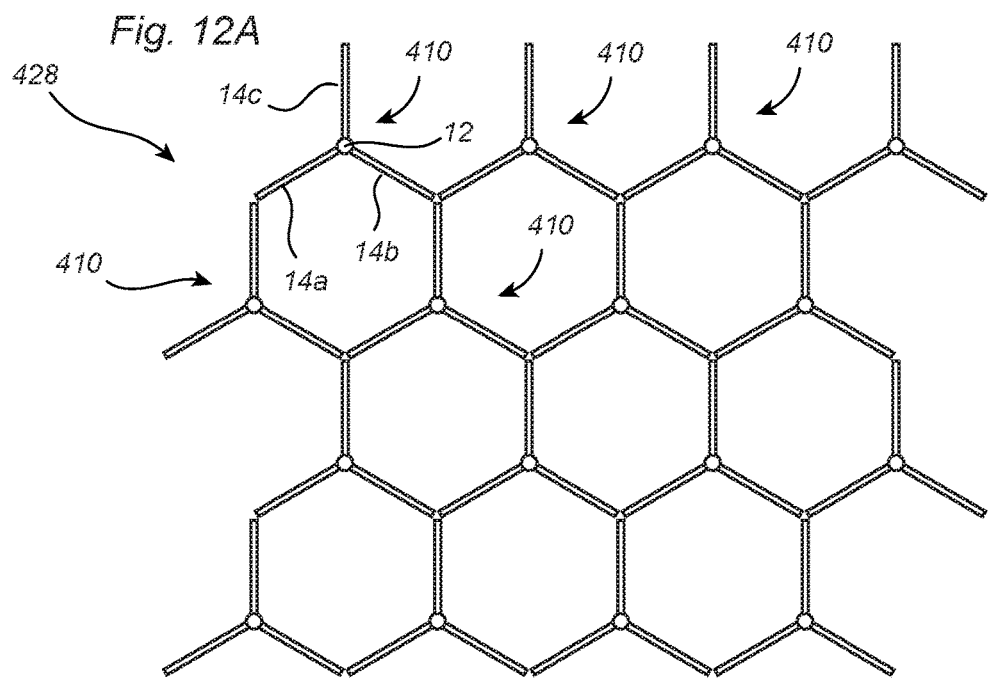
Fig. 12A
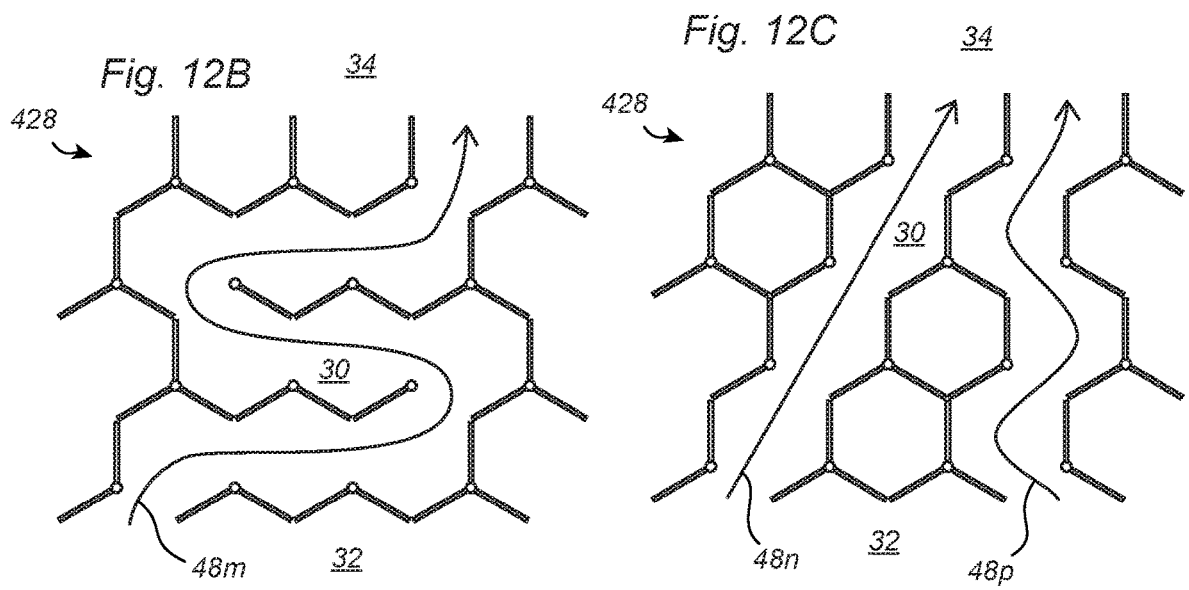
Fig. 12B
Fig. 12C
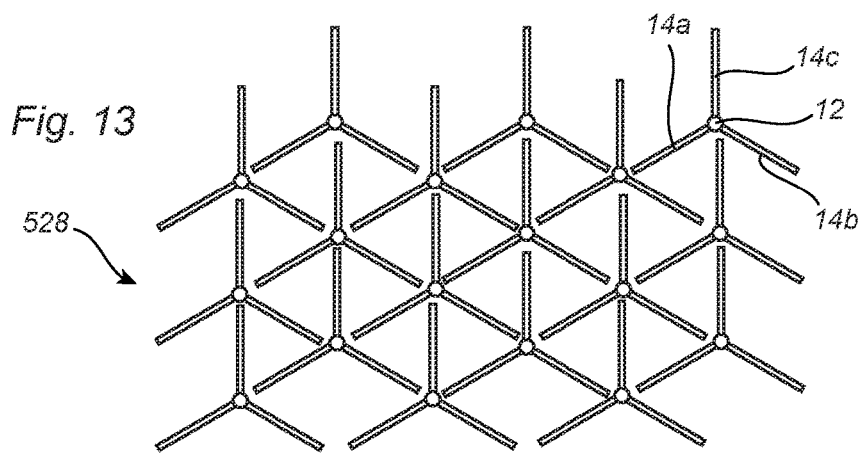
Fig. 13

PEDESTRIAN BARRIER AND QUEUE MANAGEMENT

FIELD OF THE INVENTION

The present invention relates to dynamic pedestrian barriers, queue management systems involving dynamic pedestrian barriers, and methods of enforcing a queue path to a pedestrian queue.

BACKGROUND

In crowded places such as mass events, stores and airports, queues are typically organized in queuing areas using barriers consisting of barrier posts interconnectable by belts or ropes. The queue extends along a queue path defined by the barriers, from a queue entry to a queue exit. Depending on the number of people, additional queues may be formed upstream of the queue entry, or the queue path maybe substantially empty. Therefore, the arrangement of the barriers into the queue path is based on the usual number of people, in combination with balancing the queue path length, i.e. the added effort of the people transiting the queue path, against the risk that the queue path length might be insufficient. The present invention aims to improve this.

SUMMARY

It is an object of the present invention to solve, or at least mitigate, parts or all of the above mentioned problems. To this end, according to a first aspect, there is provided a dynamic pedestrian barrier comprising a vertical barrier post; a control interface; and a plurality of motorized barrier arms carried by said barrier post, each barrier arm of said plurality of barrier arms being movable by a motor between an extended position, in which the barrier arm extends horizontally from the barrier post to block a pedestrian path, and a retracted position, in which the barrier arm is held within or adjacent to the barrier post, wherein each barrier arm of said plurality of barrier arms is individually controllable via said control interface, so as to be individually movable between its respective extended and retracted positions, and wherein said plurality of barrier arms are configured to extend, when in their respective extended positions, in different directions from the barrier post. Such a dynamic pedestrian barrier provides a high degree of flexibility in enforcing a queue path within a queuing area. Thereby, the queue path may be better adapted to the present conditions of the queuing area, such as a varying number of people in the queue. A lower end of the barrier post may be configured to be fixedly attached to a base structure, such as a floor or a ground surface, e.g. by means of a bracket. Alternatively, the barrier post may be provided with a foot configured to support the dynamic pedestrian barrier in an upright position without fixedly attaching it to the base structure. Still alternatively, the barrier post may be retractable to underground.

According to embodiments, said plurality of barrier arms may comprise at least two barrier arms configured to extend, when in their respective extended positions, at a right angle relative to each other, as seen from above. Thereby, flexibility is further increased.

According to embodiments, said plurality of barrier arms may comprise at least two barrier arms configured to extend, when in their respective extended positions, at a straight angle, i.e. 180°, relative to each other as seen from above.

According to embodiments, said plurality of barrier arms may comprise at least three barrier arms, which even further increases flexibility.

According to embodiments, said plurality of barrier arms comprises four barrier arms.

According to embodiments, at least one barrier arm of said plurality of barrier arms may be pivotally attached to the barrier post to allow pivoting about a horizontal axis. Optionally, all barrier arms of said plurality of barrier arms are pivotally attached to the barrier post. The pivotal barrier arm(s) may be controllable, via the control interface, to be pivoted between a vertical position along the barrier post and a horizontal position in which it extends in a horizontal direction.

According to embodiments, at least one barrier arm of said plurality of barrier arms may be turnable about a vertical axis. Said at least one barrier arm may be configured to turn about the barrier post. Alternatively, the barrier post may be configured to turn about its axis of elongation. Optionally, all barrier arms of said plurality of barrier arms are turnably arranged to allow turning about a vertical axis. The turning angle may be controllable via the control interface, to allow changing the horizontal direction in which the barrier arm(s) extend.

According to embodiments, at least one barrier arm of said plurality of barrier arms is telescopic, allowing a length of the barrier arm to be changed. Thereby, the at least one barrier arm can assume a compact configuration, minimizing the free volume required for operating, while still allowing a long operation range. The at least one telescopic barrier arm may comprise at least two telescopic segments which are interconnected by a prismatic joint. Optionally, all barrier arms of said plurality of barrier arms are telescopic.

According to a second aspect, there is provided a dynamic pedestrian barrier comprising a vertical barrier post; a control interface; and a motorized barrier arm carried by said barrier post, said barrier arm being movable, responsive to control signals received via said control interface, in relation to the barrier post to selectably block a pedestrian path, wherein the motorized barrier arm is movable with at least two degrees of freedom. Thereby, the dynamic pedestrian barrier may enable a greater selection of queue path options for the generation and enforcement of a queue path. The dynamic pedestrian barrier may be configured in accordance with any of the embodiments defined hereinabove. The at least two degrees of freedom may be individually controllable via said control interface.

According to embodiments, the at least two degrees of freedom may comprise at least any two, or all three, of: rotation about a horizontal axis, rotation about a vertical axis, or extension along an axis of elongation of the barrier arm.

According to a third aspect, there is provided a queue management system for managing a queue extending in a queuing area between a queue entry and a queue exit, the queue management system comprising: a plurality of dynamic pedestrian barriers, each dynamic pedestrian barrier comprising at least one movable barrier arm carried by a barrier post, the plurality of dynamic pedestrian barriers being arranged in a two-dimensional grid pattern over the queuing area; and a controller configured to control the movable barrier arms of the plurality of dynamic pedestrian barriers to be reconfigurable between at least a first configuration, in which the plurality of dynamic pedestrian barriers define a first queue path between the queue entry and the queue exit, the first queue path having a first path length; and a second configuration, in which the plurality of dynamic pedestrian barriers define a second queue path between the queue entry and the queue exit, the second queue path having a second path length different from said first path length. Such a queue management system provides a high degree of flexibility in enforcing a length or shape to a queue of pedestrians.

According to embodiments, the controller may be configured to control the plurality of barriers to be configurable between at least three different configurations, each of said configurations defining a queue path having a path length different from the other of said at least three different configurations. According to further embodiments, the controller is configured to control the plurality of dynamic pedestrian barriers to be configurable between at least four, at least five, or at least six different configurations, each of said configurations defining a queue path having a path length different from the other of said at least four, five or six different configurations.

According to embodiments, at least two dynamic pedestrian barriers of said plurality of dynamic pedestrian barriers may be arranged next to each other, such that a passage between said at least two dynamic pedestrian barriers is arranged to be selectably opened or closed by operating a movable arm of at least one of the two dynamic pedestrian barriers.

According to embodiments, the queue management system may comprise at least two adjacent rows of dynamic pedestrian barriers, each row comprising at least three dynamic pedestrian barriers.

According to embodiments, the dynamic pedestrian barriers may be arranged, as seen from above, in a plurality of rows and columns, wherein the dynamic pedestrian barriers of at least one row are offset from the dynamic pedestrian barriers of at least two other rows, such that the dynamic pedestrian barriers of said at least one row are offset from dynamic pedestrian barrier columns defined by the dynamic pedestrian barriers of said at least two other rows. Such a configuration is particularly suitable in combination with three- or four-armed barriers.

According to embodiments, at least one row of dynamic pedestrian barriers may comprise at least one dynamic pedestrian barrier provided with four movable barrier arms. The movable barrier arms may be movable to a position in which they reach towards the movable arms of an adjacent dynamic pedestrian barrier, such that movable arms of two adjacent barriers can cooperate to block a passage from two directions. Thereby, the number of dynamic pedestrian barriers may be reduced.

According to embodiments, the queue management system may comprise a camera, and the controller may be configured to operate each movable barrier arm of the plurality of dynamic pedestrian barriers; obtain, based on image data from said at least one camera, for each position of the movable arms, a model of the plurality of dynamic pedestrian barriers, the model including a representation of selectably openable and closable passages between dynamic pedestrian barriers. Such a system is particularly easy to set up and configure. The model may also be used during operation of the system, e.g. for detecting any malfunctioning dynamic pedestrian barriers.

According to embodiments, the queue management system may further comprise a pedestrian detector configured to detect a number of pedestrians within the queuing area, wherein the controller is further configured to control the plurality of barriers based on the detected number of pedestrians.

According to embodiments, the pedestrian detector may comprise a camera, and the controller may be configured to obtain, based on image data from said at least one camera, queue data representing a present and/or predicted queue length; and control, based on said queue data, said plurality of dynamic pedestrian barriers to form a queue path adapted for said queue length. The camera may be used also for detecting the positions of the dynamic pedestrian barrier arms during setup and/or operation of the system.

According to embodiments, each dynamic pedestrian barrier of said plurality of dynamic pedestrian barriers may comprise a single barrier arm, which is turnable about a vertical axis.

According to embodiments, said plurality of dynamic pedestrian barriers may dynamic pedestrian barriers as defined in any of the embodiments of the first and second aspects.

According to a fourth aspect, there is provided a queue management system for managing a queue extending in a queuing area between a queue entry and a queue exit, the queue management system comprising: a plurality of dynamic pedestrian barriers, each dynamic pedestrian barrier comprising at least one movable barrier arm carried by a barrier post, the plurality of dynamic pedestrian barriers being arranged in a two-dimensional pattern over the queuing area; and a controller configured to control the movable barrier arms of the plurality of dynamic pedestrian barriers to be reconfigurable between at least a first configuration, in which the plurality of dynamic pedestrian barriers define a first number of queue paths, each queue path extending between a respective queue entry and a respective queue exit; and a second configuration, in which the plurality of dynamic pedestrian barriers defines a second number of queue paths, each queue path extending between a respective queue entry and a respective queue exit, wherein said second number of queue paths is different from said first number of queue paths. Thereby, a single queue management system may be used for obtaining one, two, three, or more separate queue paths, for example depending on a number of open points of service. The queue paths may have different path lengths or the same path length. Preferably, each of the first and second numbers is at least one, and may be, for example, two or more. The features of the queue management system enabling different numbers of queue paths may be combined with any of the features of the other embodiments of a queue management system defined hereinabove. The features of the queue management system enabling different numbers of queue paths may also be combined with any of the features of the embodiments of a dynamic pedestrian barrier defined hereinabove.

According to a fifth aspect, there is provided a queue management system for managing a queue extending in a queuing area between a queue entry and a queue exit, the queue management system comprising: a plurality of dynamic pedestrian barriers, each dynamic pedestrian barrier comprising at least one movable barrier arm carried by a barrier post, the plurality of dynamic pedestrian barriers being arranged in a two-dimensional pattern over the queuing area; and a controller configured to control the movable barrier arms of the plurality of dynamic pedestrian barriers to be reconfigurable between at least a first configuration, in which the plurality of dynamic pedestrian barriers define a first queue path between the queue entry and the queue exit, the first queue path having a first path length; and an evacuation configuration, in which each barrier arm of the plurality of dynamic pedestrian barriers is in a retracted position, in which each respective barrier arm is held within or adjacent to the barrier post. Thereby, in case of an incident, evacuation may be permitted in several different directions. The features of the queue management system enabling an evacuation configuration may be combined with any of the features of the other embodiments of a queue management system defined hereinabove. The features of the queue management system enabling an evacuation configuration may also be combined with any of the features of the embodiments of a dynamic pedestrian barrier defined hereinabove. For maximum evacuation flexibility, the queue management system is not enclosed by static pedestrian barriers posts on any side. In an alternative configuration, the queue management system is configured to maintain a subset of the barrier arms in extended positions in the evacuation configuration, such that the queue management system shepherds the people in a direction which has been predefined according to an evacuation plan of the building or place.

According to a sixth aspect, there is provided a method of enforcing a queue path to a pedestrian queue extending in a queuing area between a queue entry and a queue exit, the method comprising operating a plurality of dynamic pedestrian barriers, each dynamic pedestrian barrier comprising at least one movable barrier arm carried by a barrier post, the plurality of dynamic pedestrian barriers being arranged in a two-dimensional pattern over the queuing area. Obviously, the method may be combined with any of the embodiments of the dynamic pedestrian barriers and queue management systems defined hereinabove. By way of example, the dynamic pedestrian barriers may be operated to define queue paths of different lengths, or to define several simultaneous queue paths, or to retract or fold all barrier arms to enable evacuating the queuing area.

It is noted that embodiments of the invention may be embodied by all possible combinations of features recited in the claims. Further, it will be appreciated that the various embodiments described for the queue management system are all combinable with the method as defined in accordance with the sixth aspect of the present invention, and vice versa.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 1A is a side view of a dynamic pedestrian barrier according to a first embodiment, with barrier arms in an extended position;

FIG. 1B is a top view of the dynamic pedestrian barrier of FIG. 1A;

FIG. 1C is a side view, corresponding to the view of FIG. 1A, of the dynamic pedestrian barrier of FIGS. 1A and 1B with the barrier arms in retracted position;

FIG. 12A is a plan view of a queue management system according to a fifth embodiment, the queue management system comprising multiple instances of the dynamic pedestrian barrier of FIG. 7, each dynamic pedestrian barrier having its barrier arms in extended position;

FIG. 12B is a plan view of the queue management system of FIG. 12A, wherein the dynamic pedestrian barriers have been operated to a configuration in which they define a first queue path;

FIG. 12C is a plan view of the queue management system of FIG. 12A, wherein the dynamic pedestrian barriers have been operated to a configuration in which they define a second queue path;

FIG. 13 is a plan view of a queue management system according to a sixth embodiment, the queue management system comprising multiple instances of the dynamic pedestrian barrier of FIG. 7, each dynamic pedestrian barrier having its barrier arms in extended position;

Figure 2A:
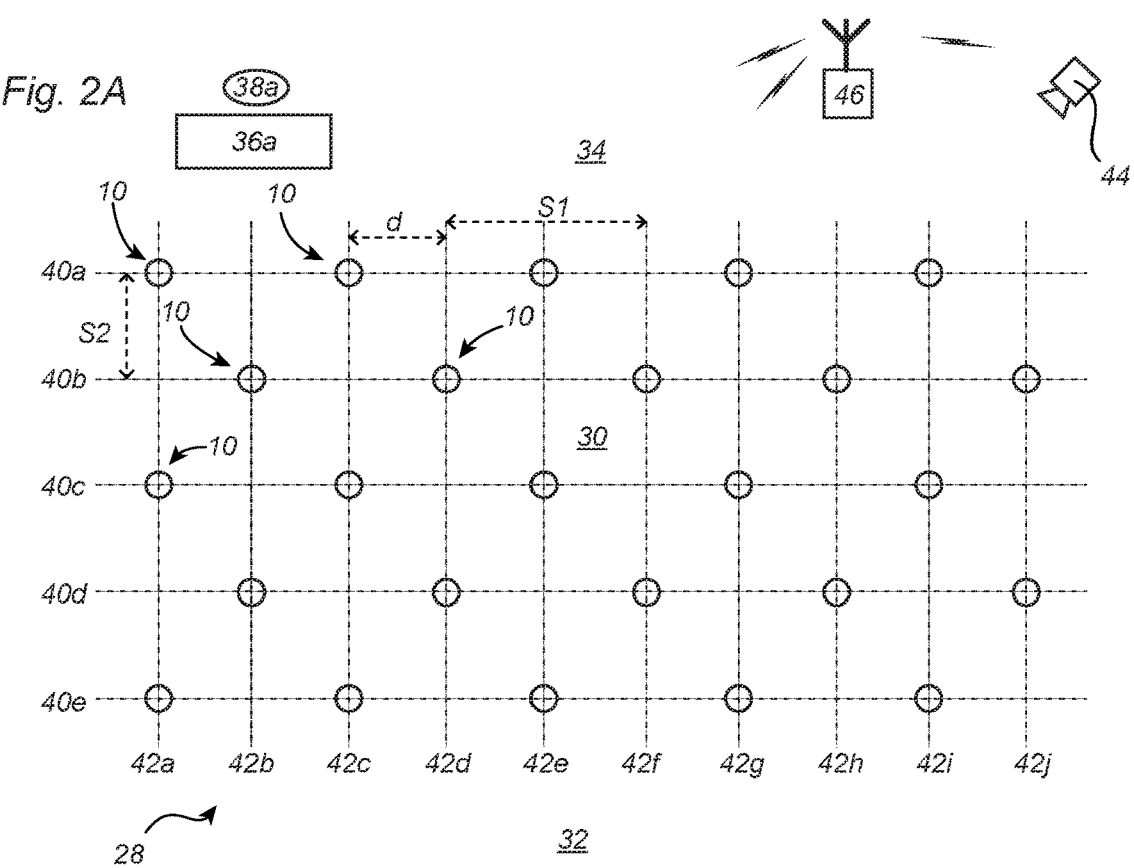
FIG. 2A is a plan view of a queue management system according to a first embodiment, the queue management system comprising multiple instances of the dynamic pedestrian barrier of FIGS. 1A-C, each dynamic pedestrian barrier having its barrier arms in retracted position.

All the figures are schematic, not necessarily to scale, and generally only show parts which are necessary in order to elucidate the embodiments, wherein other parts may be omitted.

DETAILED DESCRIPTION OF THE EXEMPLARY EMBODIMENTS

FIGS. 1A, 1B and 10 illustrate a dynamic pedestrian barrier 10 comprising a vertical barrier post 12, and four motorized barrier arms 14a-d carried by said barrier post 12, at an upper end thereof. Each barrier arm 14a-d is individually controllable, and actuated by means of one or several motors, to be individually movable between an extended position, illustrated in FIGS. 1A and 1B, and a retracted position, illustrated in FIG. 1C. FIG. 1A illustrates the dynamic pedestrian barrier 10 as seen from the side, whereas FIG. 1B illustrates the dynamic pedestrian barrier as seen from above. When in the extended position, all arms extend along a horizontal plane H (FIG. 1A). The lower end 11 (FIG. 1A) of the barrier post 12 comprises a bracket 16 configured to be fixedly attached to a floor.

As is apparent from FIG. 1B, a first barrier arm 14a extends in a first direction Da from the barrier post 12; a second barrier arm 14b extends in a second direction Db from the barrier post 12, wherein the second direction Db forms a right angle with the first direction Da; a third barrier arm 14c extends in a third direction Dc from the barrier post 12, wherein the third direction Dc forms a straight angle with the first direction Da and a right angle with the second direction Db; and a fourth barrier arm 14d extends in a fourth direction Dd from the barrier post 12, wherein the fourth direction Dd forms a straight angle with the second direction Db and a right angle with the third and first directions Da, Dc.

Each barrier arm 14a-d (FIG. 1B) is telescopic, and comprises a plurality of telescopic segments 18a-g (FIG. 1A) interconnected by prismatic joints 20a-f, allowing the telescopic segments 18a-g to be telescopically extended or telescopically retracted one inside another. Moreover, each barrier arm 14a-d is pivotally suspended to the barrier post 12, allowing each barrier arm 14a-d to pivot about a respective horizontal pivot axis 22a-d between the position of FIG. 1A, in which the barrier arms 14a-d are pivotally extended, and the position of FIG. 1C, in which the barrier arms 14a-d are pivotally retracted and extend in a vertical direction. The barrier arms 14a-d may be pivoted between the horizontal direction (FIG. 1A) and the vertical direction (FIG. 1C) either when they're telescopically extended (FIG. 1A), or when they're telescopically retracted (FIG. 1C). Thereby, each barrier arm 14a-d is configured to be individually moved in two independent degrees of freedom, namely rotation about a respective horizontal axis 22a-d, and extension along the longitudinal direction Da-Dd of the respective barrier arm 14a-d. Optionally, the upper part of the dynamic pedestrian barrier 10 may be configured to turn about a vertical axis in relation to the lower part, thereby adding a third degree of freedom to each barrier arm 14a-d.

The dynamic pedestrian barrier 10 is further provided with a control interface, which in the illustrated embodiment is schematically illustrated as a wireless interface 24 of a control circuit (not illustrated). The control circuit is configured to, responsive to received wireless control signals 26, individually control motion in each degree of freedom of each respective barrier arm 14a-d by operating motors (not illustrated) for moving the respective barrier arms 14a-d.

Figure 2B:
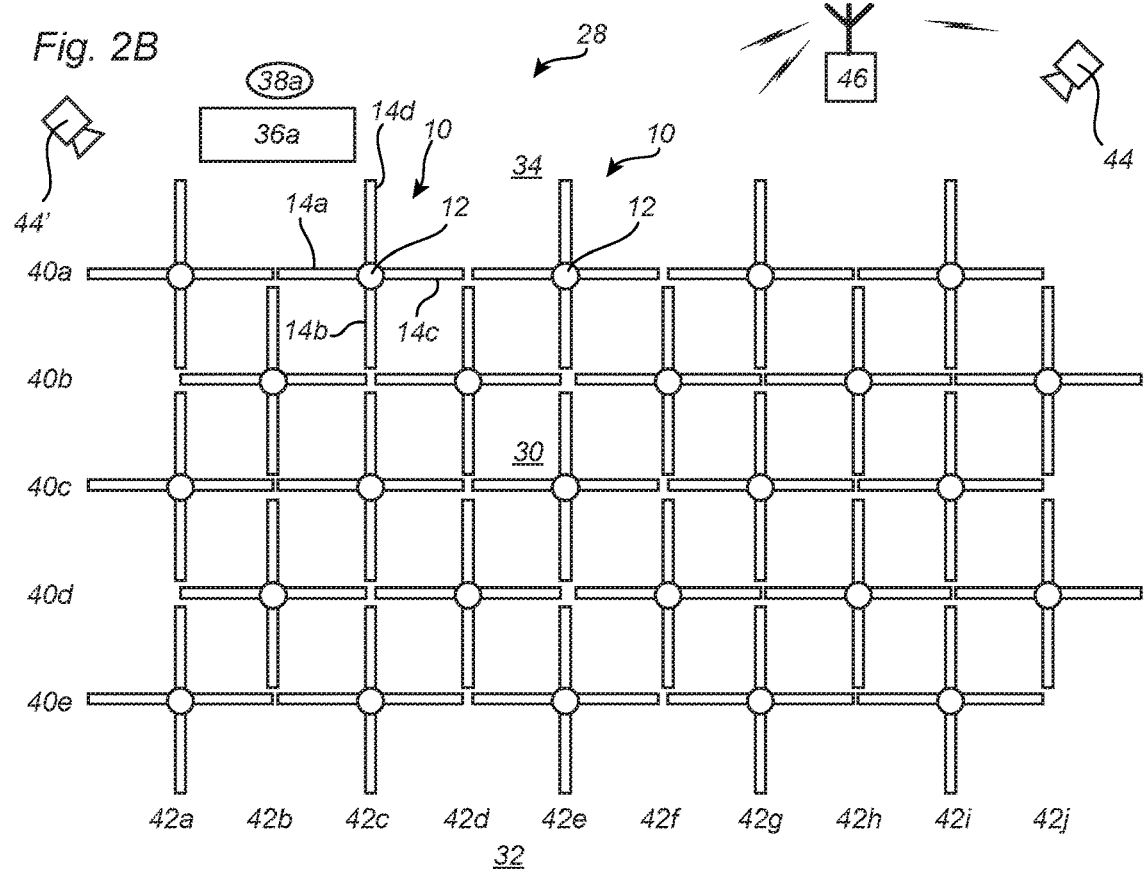
FIG. 2B is a plan view of the queue management system of FIG. 2A, wherein each dynamic pedestrian barrier has its barrier arms in extended position.
Figure 2C:
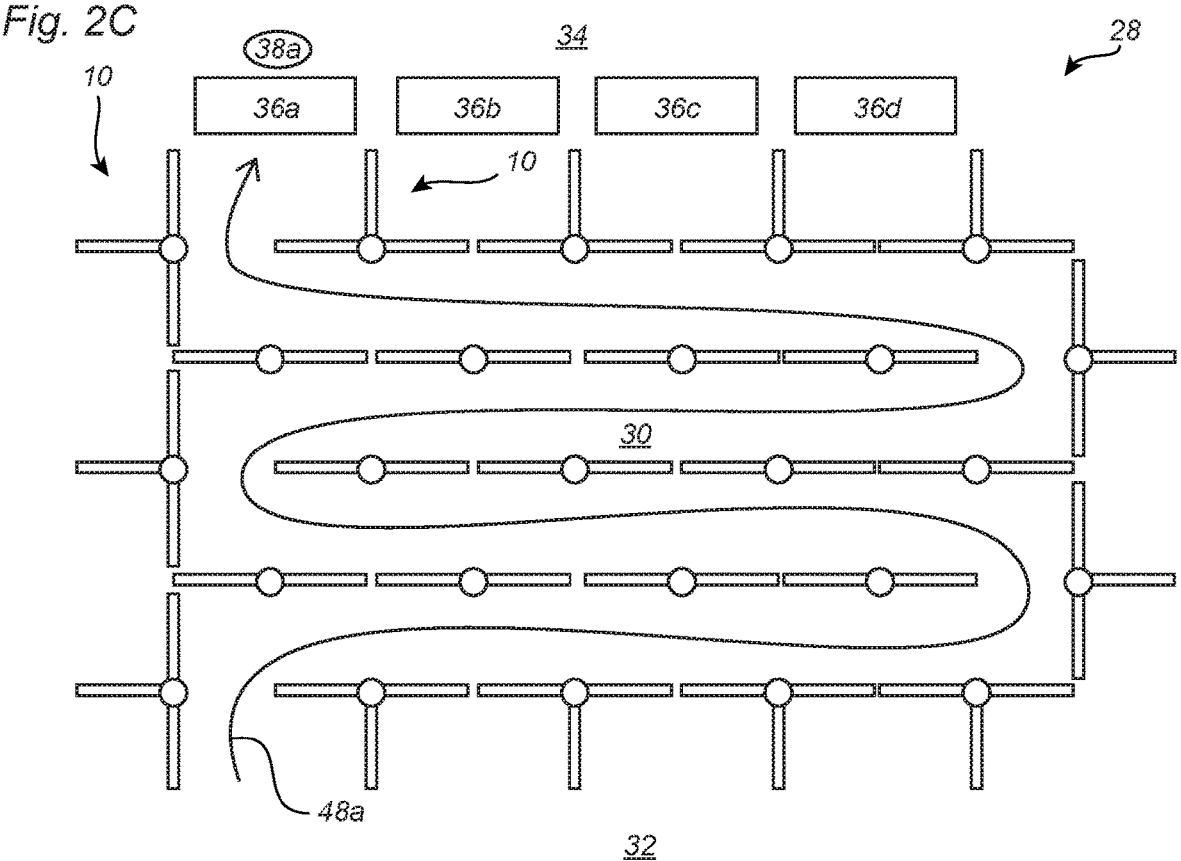
FIG. 2C is a plan view of the queue management system of FIG. 2A, wherein the dynamic pedestrian barriers have been operated to a configuration in which they define a first queue path.

FIGS. 2A and 2B illustrate, as seen from above, the deployment of a plurality of dynamic barriers 10 in a queue management system 28 for managing a queue of pedestrians, the queue extending in a queuing area 30 between a queue entry 32 and a queue exit 34. The queue management system 28 comprises a plurality of dynamic pedestrian barriers 10 of the type described hereinabove, which are arranged in a two-dimensional grid pattern over the queuing area 30. In the view of FIG. 2A, all dynamic pedestrian barriers 10 are illustrated with their barrier arms 14a-d (FIG. 1B) in their retracted positions, corresponding to the position of FIGS. 1A and 1B, whereas FIG. 2B illustrates all dynamic pedestrian barriers 10 with their respective barrier arms 14a-d (FIG. 1B) in their extended positions, corresponding to the position of FIG. 1C. A first service point 36a, which provides a service to people approaching the service point 36a via the queuing area 30, is staffed by a service point operator 38a. Second, third and fourth service points 36b-d (FIGS. 2C-F) are unstaffed.

The dynamic pedestrian barriers 10 are arranged in a plurality of rows 40a-40e and a plurality of columns 42a-42j. The barriers posts 12 (FIG. 1A) of the dynamic pedestrian barriers 10 of each row are separated by a separation distance 51 corresponding to about twice the length of a barrier arm 14a-d when in extended position, and the rows 40a-e are separated from each other by a separation distance S2 corresponding to about the length of a single barrier arm 14a-d when in extended position. The dynamic pedestrian barriers of every second row 40b, 40d are offset from the columns 42a, 42c, 42e, 42g, 42i defined by the barriers of the other rows 40a, 40c, 40e by an offset distance d corresponding to about the length of a single barrier arm 14a-d when in extended position.

The queuing area 30 is monitored by a camera 44, which is configured to capture images for image processing, to detect a number of pedestrians within the queuing area 30. The camera 44 may also be configured to monitor the queue entry 32 and an area upstream of the queue entry 32, to detect a number of people approaching the queuing area 30, along with their respective speeds of approachment.

Thereby, it is also possible to predict the number of people which will reach the queuing area 30 within a time increment. Still further, the camera 44 may also be configured to monitor the service point area at the queue exit 34, to detect the extent to which the service point 36*a* is staffed. Thereby, it is also possible to predict the number of people which leave the queuing area 30 within a time increment. The queue management system 28 uses the queue data representing a present and/or predicted queue length as control input for controlling the dynamic pedestrian barriers 10 to form different queue path adapted for different queue lengths. A controller 46 receives image data from the camera 44, and controls each of the dynamic pedestrian barriers 10, for example via the wireless control interface 24 (FIG. 1A).

The camera 44 may also be used for detecting the positions of the dynamic pedestrian barrier arms 14*a-d* (FIG. 1B) of each dynamic pedestrian barrier 10 during setup and/or operation of the system. Starting with FIG. 2A, after installing the dynamic pedestrian barriers 10 in the queuing area 30, the camera 44 captures an image of the rows and columns 40*a-e*, 42*a-j* of dynamic pedestrian barriers 10. Then, all barrier arms 14*a-d* (FIG. 1B) of all dynamic pedestrian barriers 10 are operated to their respective extended positions, illustrated in FIG. 2B, and the camera again captures an image of the dynamic pedestrian barriers 10. The image of the configuration in FIG. 2B is compared with the image of the configuration in FIG. 2A, and processed to identify the positions of the barrier arms 14*a-d* within the queuing area, and to automatically identify obtainable queue line paths therethrough. The controller 46 may also, or alternatively, operate each movable barrier arm 14*a-d* of each dynamic pedestrian barrier 10 in turn, and for each operation, based on image data captured by the camera 44, identify the obtainable positions for the respective barrier arm 14*a-d* within the queuing area 30. Thereby, a complete model of the dynamic pedestrian barriers 10 may be obtained, the model including a representation of selectably openable and closable passages between dynamic pedestrian barriers 10. The procedure of stepping through the dynamic pedestrian barriers 10 and barrier arms 14*a-d* for creating a model may be automatically followed by the controller 46 based on an instruction received via e.g. a user interface during setup of the system 28. The model may also be used during operation of the queue management system 28, e.g. for detecting if any of the barrier arms 14*a-d* does not respond as expected to commands sent by the controller 46. Based on the model, the controller 46 may calculate which queue paths are obtainable, and associate each obtainable queue path with a respective queue path length. Optionally, a second camera 44' may be positioned to capture the queuing area 30 from another angle, to facilitate obtaining a three-dimensional model of the dynamic pedestrian barriers 10 and the spatial positions of pedestrians within the queuing area 30.

Figure 2D:
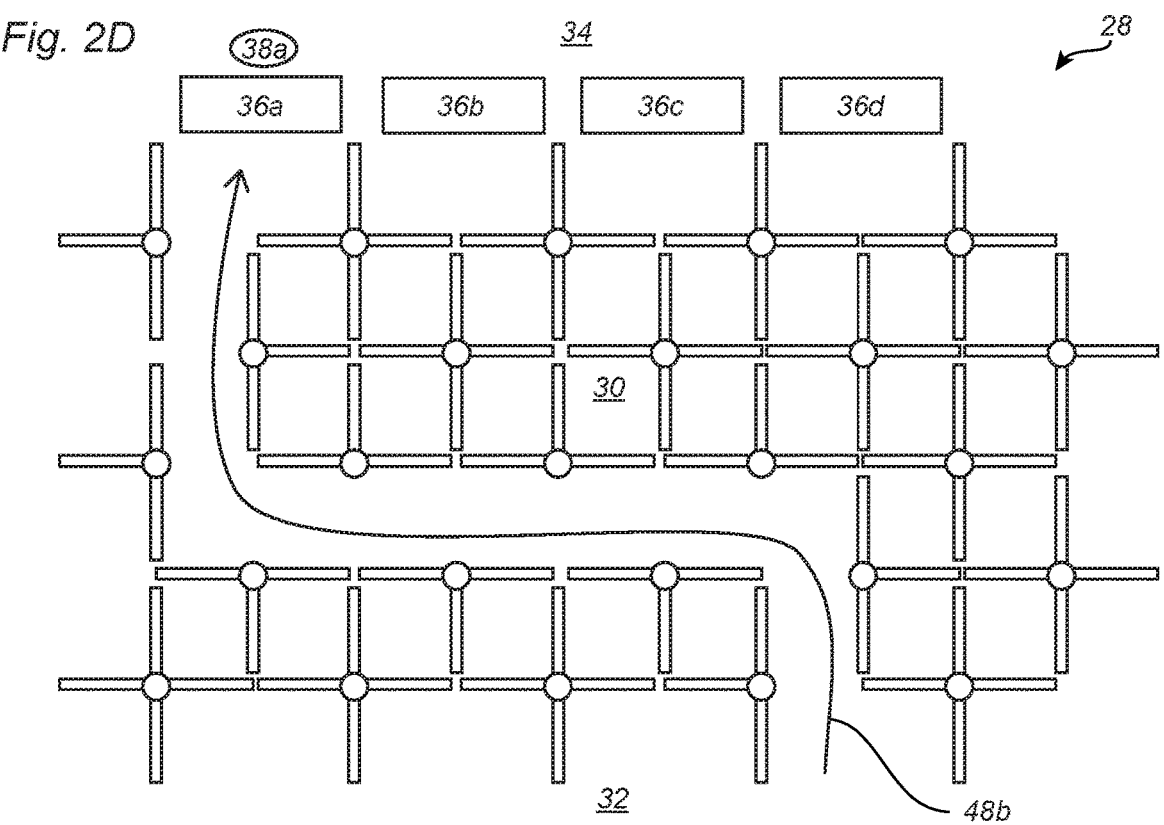
FIG. 2D is a plan view of the queue management system of FIG. 2A, wherein the dynamic pedestrian barriers have been operated to a configuration in which they define a second queue path.

FIGS. 2C-2F illustrate a few examples of how the queue management system 28 may be operated to define different queue paths through the queuing area 30. As is apparent from the large number of dynamic pedestrian barriers 10 within the system 28, very many different queue paths are obtainable, and those illustrated in FIGS. 2C-2F are merely examples. Starting with FIG. 2C, the barrier arms 14*a-d* of the dynamic pedestrian barriers 10 are positioned in a first configuration, in which the plurality of dynamic pedestrian barriers 10 define a first queue path 48*a* between the queue entry 32 and the queue exit 34, the first queue path 48*a* having a first path length. If the controller 46 (FIG. 2B), based on images of the queuing area 30, determines that the number of people in the queue falls below a threshold, the controller 46 may control a subset of the dynamic pedestrian barriers 10 to move their respective barrier arms 14*a-d* (FIG. 1B) to define another queue path which is better adapted for the number of people in the queue. FIG. 2D illustrates the barrier arms 14*a-d* of the dynamic pedestrian barriers 10 in a second configuration, in which the plurality of dynamic pedestrian barriers 10 define a second queue path 48*b* between the queue entry 32 and the queue exit 34, the second queue path 48*b* having a second path length which is shorter than the first path length 48*a* illustrated in FIG. 2C. When reconfiguring the dynamic pedestrian barriers 10, the controller may be configured to select a queue path, and determine a reconfiguration order of the respective dynamic pedestrian barriers 10, which does not change the order of the persons in queue, and/or which minimizes the possibility that moving barrier arms interfere with people in the queue or hinder their movement.

Figure 2E:
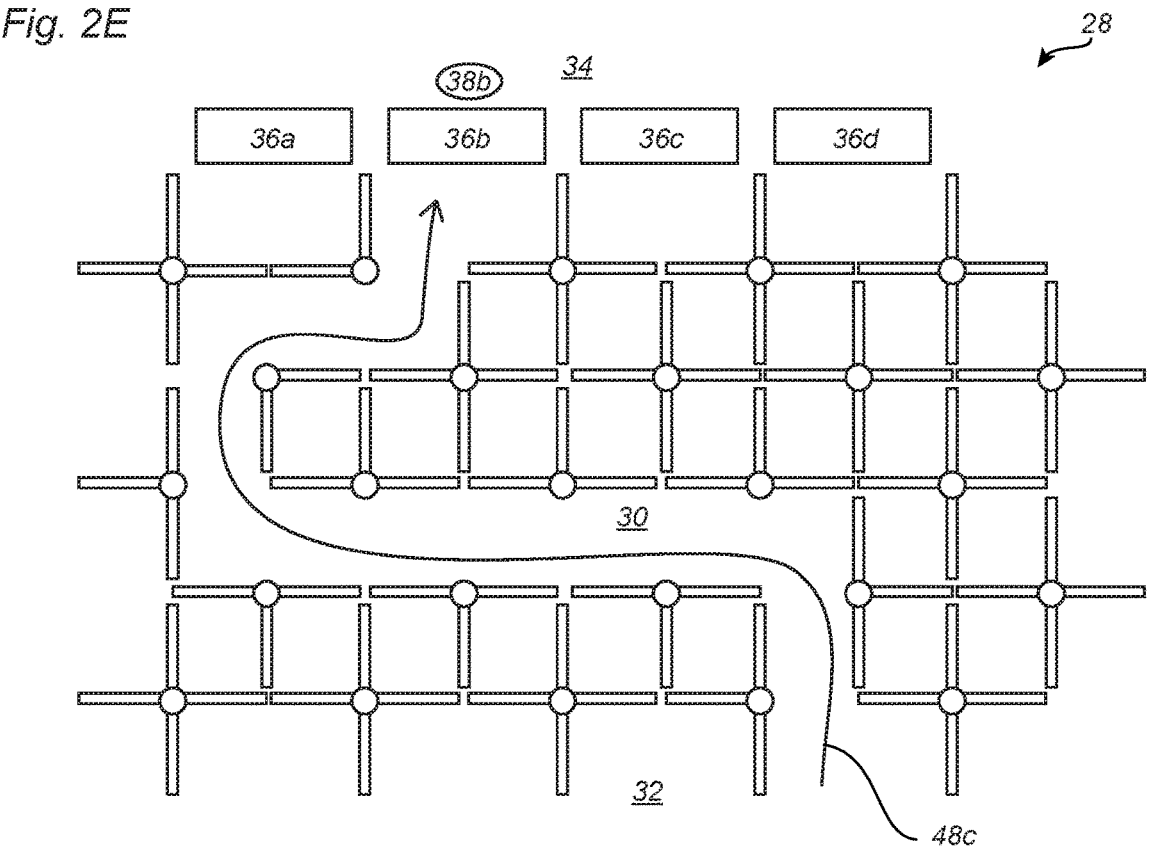
FIG. 2E is a plan view of the queue management system of FIG. 2A, wherein the dynamic pedestrian barriers have been operated to a configuration in which they define a third queue path.

The controller 46 may receive a service point change indication, for example via the camera 44 (FIG. 2A) or via a user interface at any of the service points 36*a-d*, that the set of open service points has changed. By way of example, the service point indication may indicate that the first service point 36*a* is closing, and the second service point 36*b* is opened by a second service point operator 38*b*. Based on the service point indication, the controller 46 (FIG. 2A) operates the dynamic pedestrian barriers 10 to define a third queue path 48*c* ending at the second service point 36*b*, which is illustrated in FIG. 2E. Incidentally, the third queue path 48*c* has a third path length which is different from the path lengths of the first and second queue paths 48*a-b*. It is also possible to operate the dynamic pedestrian barriers 10 to a configuration that does not change the queue path length, but only changes the shape of the queue path.

Figure 2F:
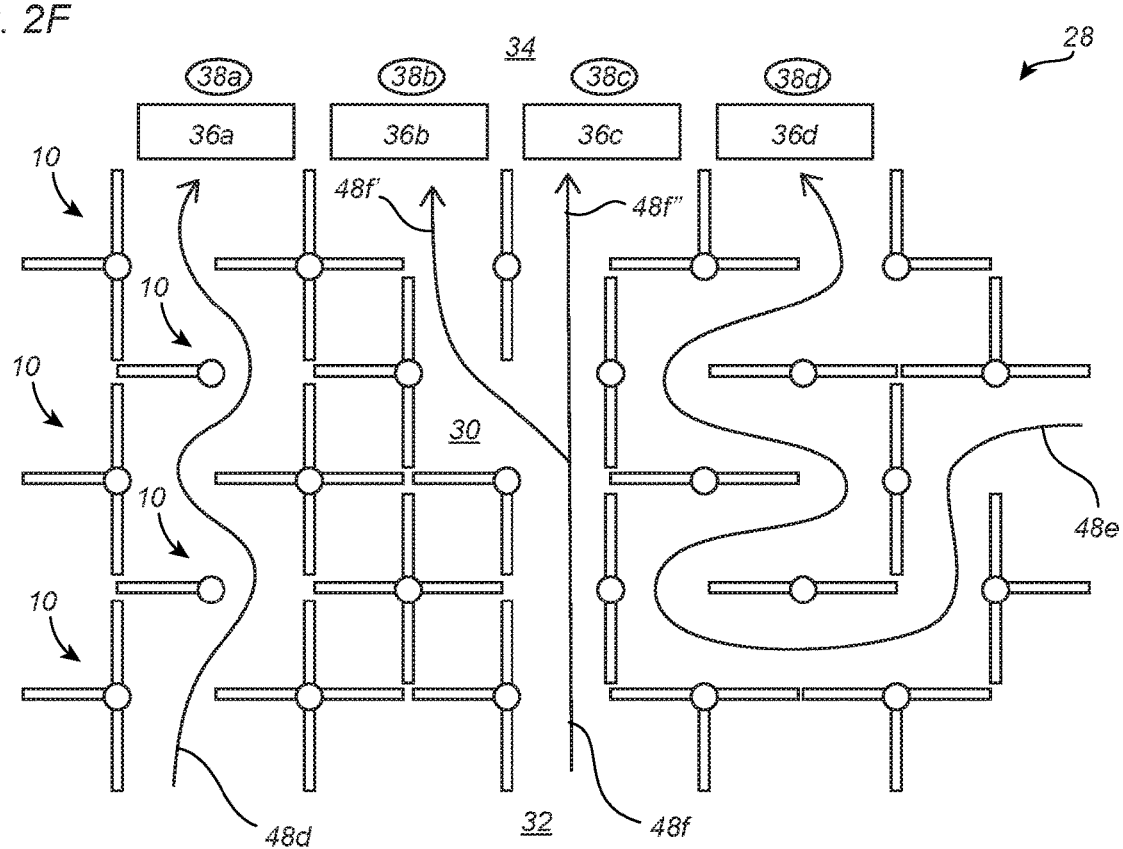
FIG. 2F is a plan view of the queue management system of FIG. 2A, wherein the dynamic pedestrian barriers have been operated to a configuration in which they define a fourth, a fifth, and a sixth queue path.

FIG. 2F illustrates the queue management system 28 with the dynamic pedestrian barriers 10 arranged in yet an exemplary configuration. The queue management system 28 enables simultaneously obtaining several different queue paths 48*d-f* of a different path lengths. One queue path 48*d* ends at the first service point 36*a*, another queue path 48*e* enters the queuing area 30 from the side and ends at the fourth service point 36*d*, and still another queue path 48*f*, which may define a fast-track line, forks to two branches 48*f'*, 48*f''* served by two service points 36*b* and 36*c*. As illustrated by the queue path 48*f*, the dynamic pedestrian barriers 10 may be reconfigured to define a one-to-multiple relationship between queue path starting points and queue path end points. Similarly, the dynamic pedestrian barriers 10 may be reconfigured to define a multiple-to-one relationship between queue path starting points and queue path end points, for merging two or more queues into one. This may be useful, for example, when closing a service point, whereby the people queuing for the closing service point may be merged into a queue to another service point which remains open. As is apparent, many different queue path lengths and shapes are obtainable using the queue management system 28, since the dynamic pedestrian barriers 10 can be reconfigured to define a queue path of arbitrary shape and length within the queuing area 30.

The camera 44 (FIG. 2A) may also be used for automatically detecting an anomaly, for example crowd movements exceeding a crowd movement threshold. The controller 46 (FIG. 2A) may, based on the anomaly detection, reconfigure the dynamic pedestrian barriers 10 in an evacuation configuration, in which each barrier arm 14*a-d* of the plurality of dynamic pedestrian barriers 10 is in a retracted position, in which each respective barrier arm 14*a-d* is held within or adjacent to the barrier post 12. The configuration of FIG. 2A may be used as such an evacuation configuration of the dynamic pedestrian barriers 10. Thanks to all barrier arms 14*a-d* being retracted, the queuing area 30 may quickly be evacuated in all directions. The evacuation configuration may also be activated based on other signals, such as signals from a smoke or fire detector, or via a user interface.

Figure 3A:
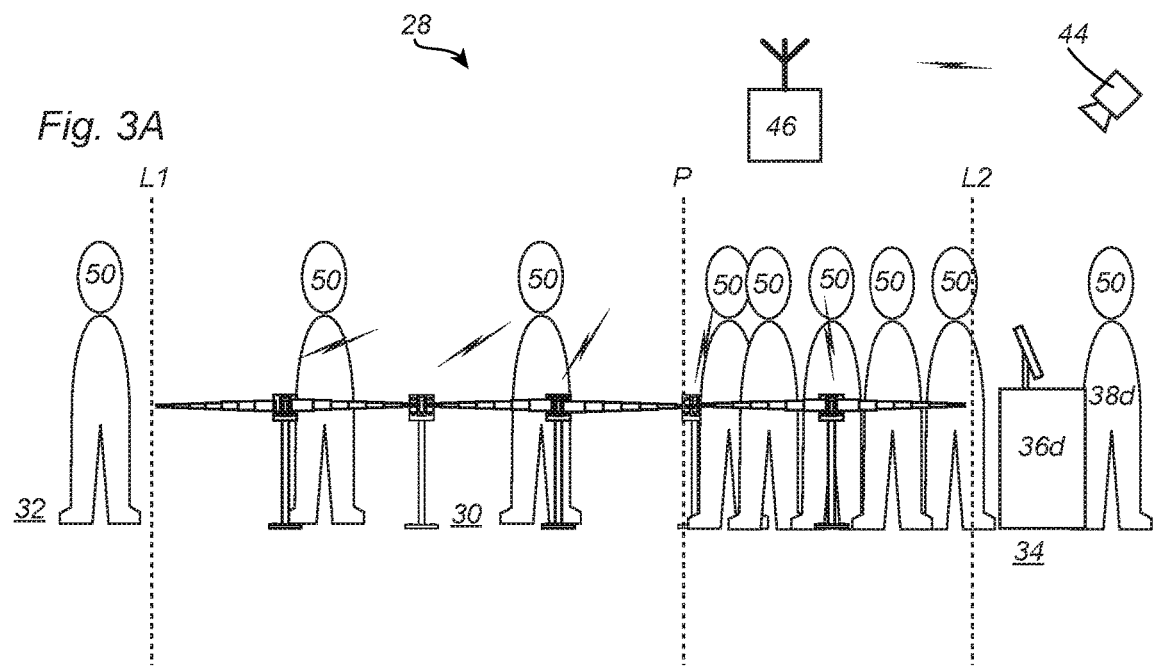
FIG. 3A is a side view of a portion of the queue management system of FIG. 2A, wherein the dynamic pedestrian barriers define a queue path.
Figure 3B:
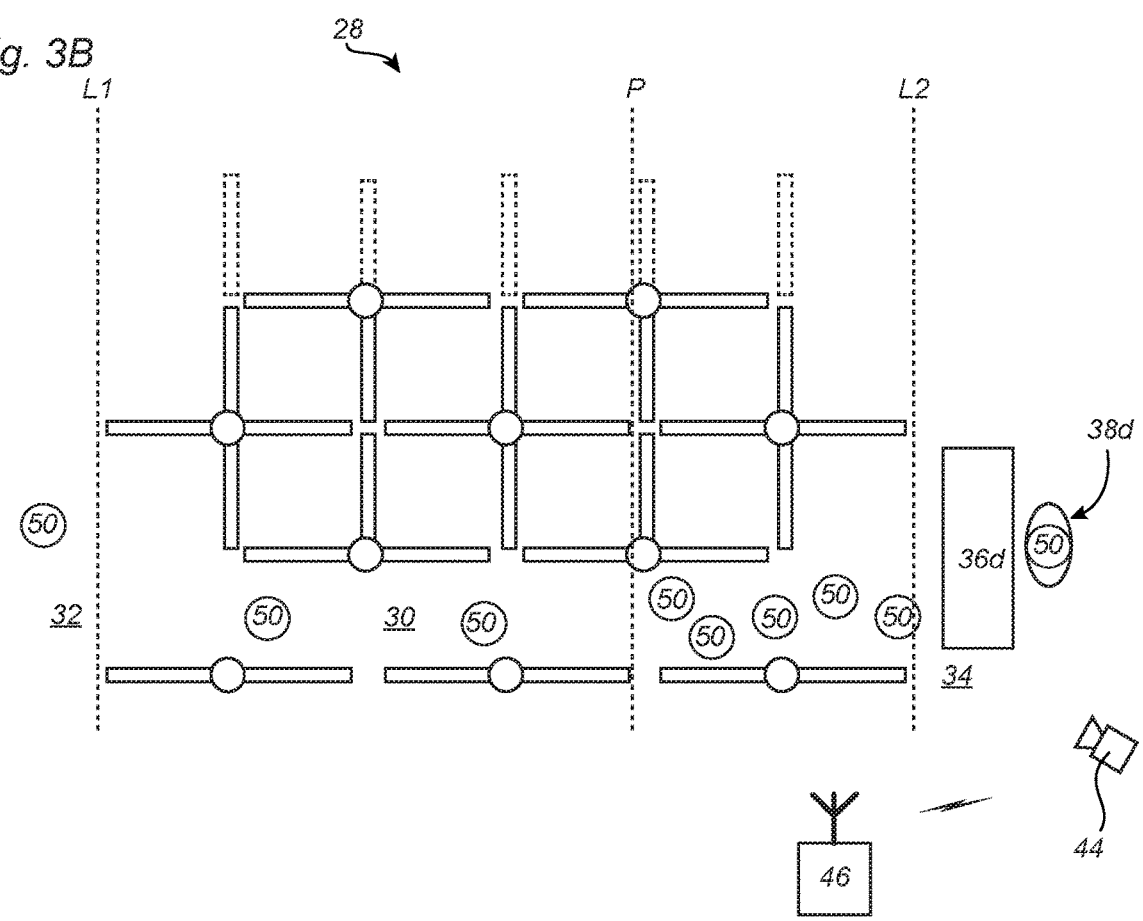
FIG. 3B is a plan view of the portion of the queue management system illustrated in FIG. 3A.

FIG. 3A illustrates the queue management system 28 as seen from the side, and with all barrier arms 14*a-d* (FIG. 1D) in extended position. The camera 44 and controller 46, which together define a video analytics system, are configured to detect the number of people within the queuing area 30 by determining the number of heads 50 in the image. At regular intervals, the camera 44 captures an image of the queuing area 30. Based on the captured images, the controller 46 counts the number of people in the queuing area 30 via head detection, and measures the speed and direction of their movement by tracking or comparing with a previous image. The controller 46 also counts the number of people in an extended area 32, 34 which is directly or indirectly related to the queue area 30, track their movements, and measure the speed and direction of their movement. In order to determine the queue length, the controller 46 determines the position of the starting point of the queue line by determining the most distal point P within the queuing area 30 where the density of heads 50 exceeds a limit density, and/or the average speed of detected persons falls below a speed threshold corresponding to a typical walking speed. The controller 46 also measures the number of people passing via the service point 36; measures the queuing time for passing from the queue starting point L1 to the service point 36; detects the positions of the dynamic pedestrian barriers 10; and detects the orientation and the state of the barrier elements 14*a-d* of the dynamic pedestrian barriers 10.

The controller 46 further performs face recognition of persons passing a virtual queue area entry line L1, and measures the actual waiting time from when persons cross the queue area entry line L1 to when they cross a virtual queue exit line L2, at which queue exit line L2 persons are re-identified using face recognition. The queue management system 28 may also display the expected waiting time on a screen (not illustrated), to inform the people in the queue.

Figure 4A:
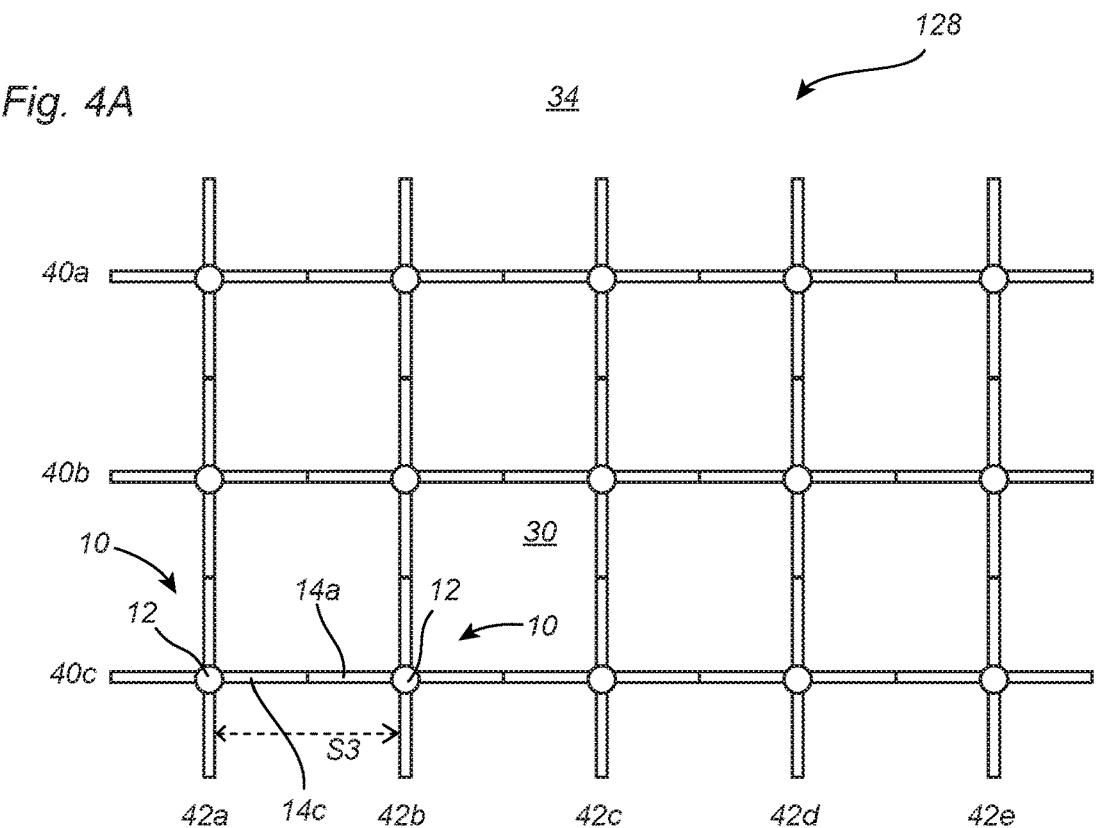
FIG. 4A is a plan view of a queue management system according to a second embodiment, the queue management system comprising multiple instances of the dynamic pedestrian barrier of FIGS. 1A-C, each dynamic pedestrian barrier having its barrier arms in extended position.
Figure 4B:
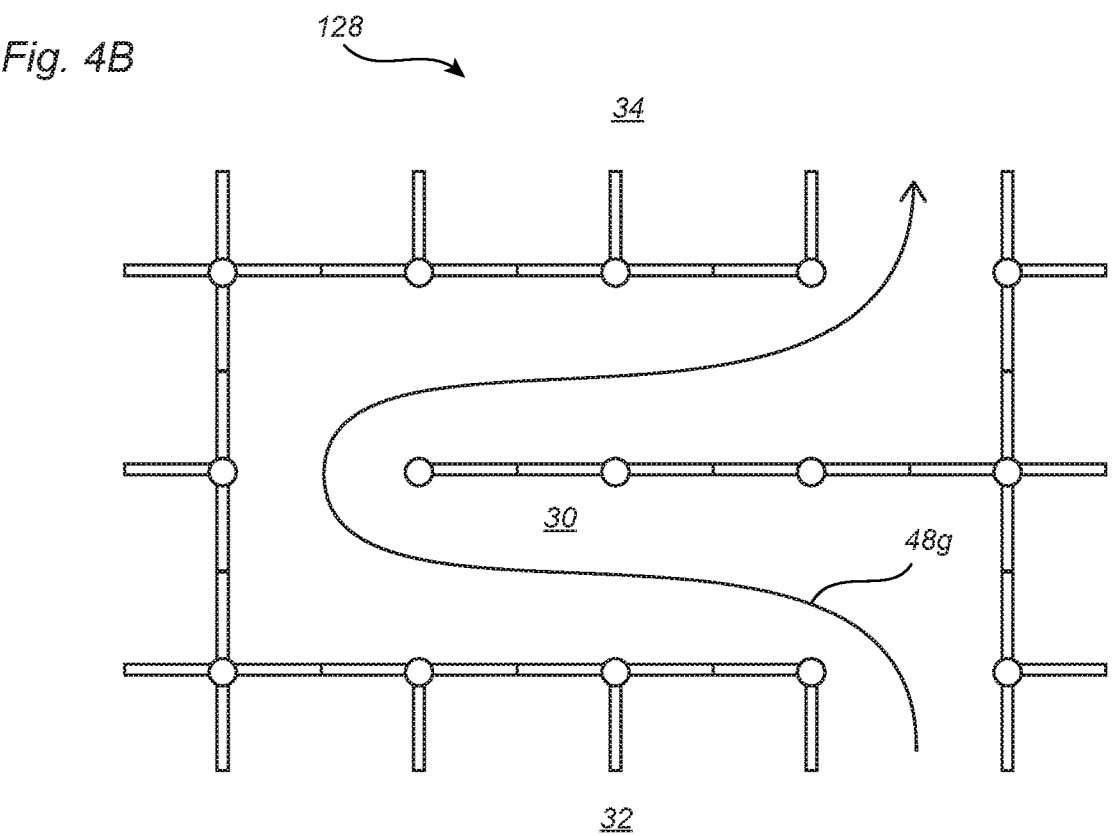
FIG. 4B is a plan view of the queue management system of FIG. 4A, wherein the dynamic pedestrian barriers have been operated to a configuration in which they define a queue path.

FIG. 4A illustrates a second embodiment of a queue management system 128, again with all barrier arms 14*a-d* (FIG. 1B) extended. Similar to the queue management system 28 of FIGS. 2A-F, the queue management system 128 of FIG. 3A comprises a plurality of dynamic pedestrian barriers 10 arranged in rows 40*a-c* and columns 42*a-e*, as seen from above. However, the queue management system 128 differs from the queue management system 28 of FIGS. 2A-F in that each row 40*a-c* has a dynamic pedestrian barrier 10 in each column 42*a-e*, and in that each dynamic pedestrian barrier 10 is spaced from adjacent dynamic pedestrian barriers 10 in the same row and column by a separation distance S3 corresponding to twice the length of a barrier arm 14*a-d* (FIG. 1B). Thereby, arms of two adjacent dynamic pedestrian barriers 10 cooperate to open and close a passage between the respective barrier posts 12. FIG. 4B illustrates an exemplary queue path 48*g* formed by the dynamic pedestrian barriers 10 in response to having been operated by the controller (not illustrated). The geometry of a strictly quadratic deployment grid of the dynamic pedestrian barriers 10 has the benefit that a wider queue path may be obtained. Alternatively, shorter barrier arms may be used, which may increase the dynamic pedestrian barrier's 10 ability to withstand loads from a crowd.

Figure 5:
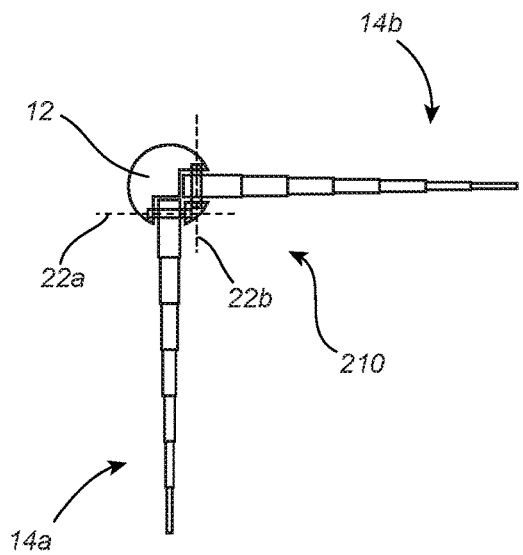
FIG. 5 is a plan view of a dynamic pedestrian barrier according to a second embodiment, with barrier arms in an extended position.

FIGS. 5, 6, 7, 8 and 9 illustrate additional exemplary embodiments of a dynamic pedestrian barrier 210, 310, 410, 510, 610 provided with motorized, movable barrier arms controllable via a control interface, to allow controlling by a controller such as the controller 46 of FIG. 2A. Starting with FIG. 5, illustrating a second embodiment of a dynamic pedestrian barrier 210 from above, the dynamic pedestrian barrier 210 is similar to the dynamic pedestrian barrier 10 of FIGS. 1A-C, but differs in that it has only two barrier arms 14*a*, 14*b*. The two barrier arms 14*a*, 14*b* are arranged at a right angle to each other. Each of the barrier arms 14*a*, 14*b* is motorized to be independently movable in two degrees of freedom: by extending telescopically, or by folding about a respective pivot axis 22*a*, 22*b*.

Figure 6:
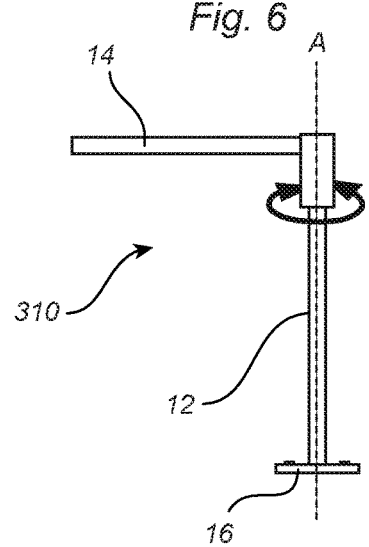
FIG. 6 is a side view of a dynamic pedestrian barrier according to a third embodiment.

FIG. 6 illustrates a third embodiment of a dynamic pedestrian barrier 310 from the side. The dynamic pedestrian barrier 310 has a single barrier arm 14 fixedly attached to the barrier post 12, such that the barrier arm 14 is unable to assume a retracted or folded position. However, the dynamic pedestrian barrier 310 is nevertheless reconfigurable by turning the barrier post 12, by a turning motor, about a vertical axis A in a bearing in the floor bracket 16.

Figure 7:
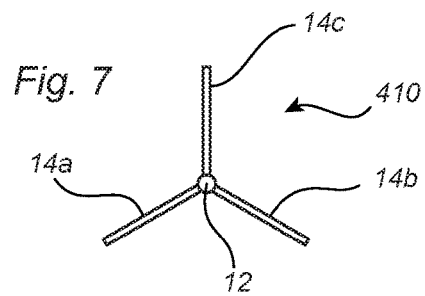
FIG. 7 is a plan view of a dynamic pedestrian barrier according to a fourth embodiment, with barrier arms in an extended position.

FIG. 7 illustrates a fourth embodiment of a dynamic pedestrian barrier 410 seen from above. The dynamic pedestrian barrier 410 has three barrier arms 14*a*-14*c* extending, when in their respective extended positions, at 120 degrees angle to each other in a horizontal plane. Each of the barrier arms 14*a-c* may be independently movable between a retracted position and an extended position in any suitable manner.

Figure 8:
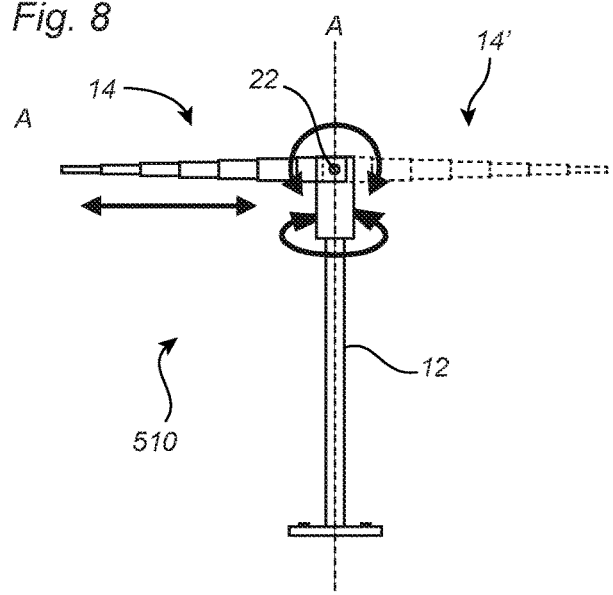
FIG. 8 is a side view of a dynamic pedestrian barrier according to a fifth embodiment, with a barrier arm in an extended position.

FIG. 8 illustrates a fifth embodiment of a dynamic pedestrian barrier 510 seen from the side. The dynamic pedestrian barrier 510 has a single barrier arm 14 which may be telescopically extended, turned about a vertical axis A, and turned about a horizontal axis 22. Thereby, the barrier arm 14 is movable in three independent degrees of freedom, two of which independently allowing the barrier arm 14 to reach the opposite position 14' illustrated with dashed lines.

Figure 9:
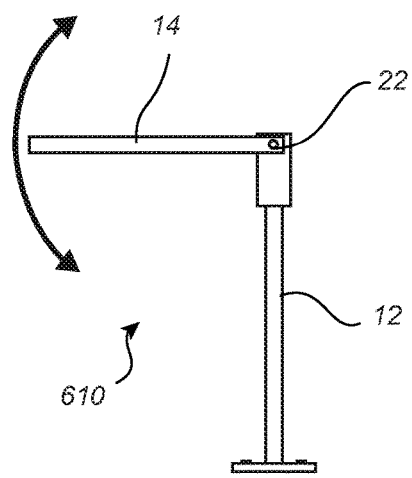
FIG. 9 is a side view of a dynamic pedestrian barrier according to a sixth embodiment, with a barrier arm in an extended position.

FIG. 9 illustrates a sixth embodiment of a dynamic pedestrian barrier 610. The dynamic pedestrian barrier 610 has a single, rigid barrier arm 14 which may be pivoted about a horizontal pivot axis 22, which allows moving the barrier arm 14 between a retracted position, in which it extends along the barrier post 12, and an extended position in which it extends horizontally from the barrier post 12.

Figure 10A:
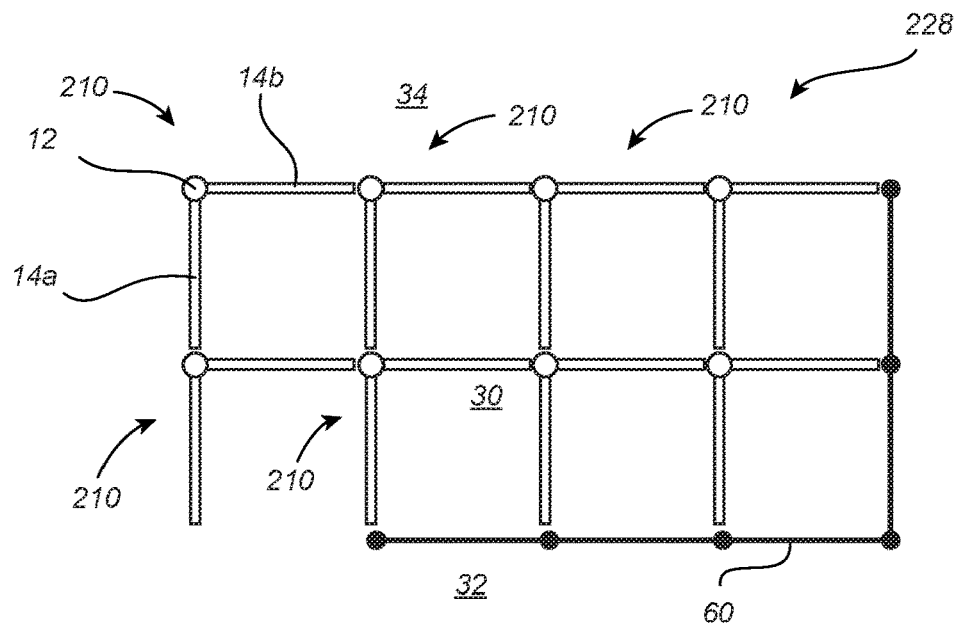
FIG. 10A is a plan view of a queue management system according to a third embodiment, the queue management system comprising multiple instances of the dynamic pedestrian barrier of FIG. 5, each dynamic pedestrian barrier having its barrier arms in extended position.

FIG. 10A illustrates a third embodiment of a queue management system 228 as seen from above, again with all barrier arms 14*a-b* extended. The queue management system 228 comprises a plurality of dynamic pedestrian barriers 210 of the type described with reference to FIG. 5, which are again arranged in a grid of rows and columns. A static pedestrian barrier 60, which has no elements movable responsive to control input from the controller 46 (FIG. 2A), extends along two sides of the grid. By combining the dynamic pedestrian barriers 210 with a static pedestrian barrier 60, the number of dynamic pedestrian barriers 210 may be kept low, while maintaining the ability to define a large number of different queue paths through the grid of barriers 210. It will be appreciated that static barriers are combinable with all other dynamic pedestrian barriers or queue management systems described herein, for example the queue management systems 28, 128 already described with reference to FIGS. 2A-F and 4A-B, for increasing the number of obtainable queue paths.

Figure 10B:
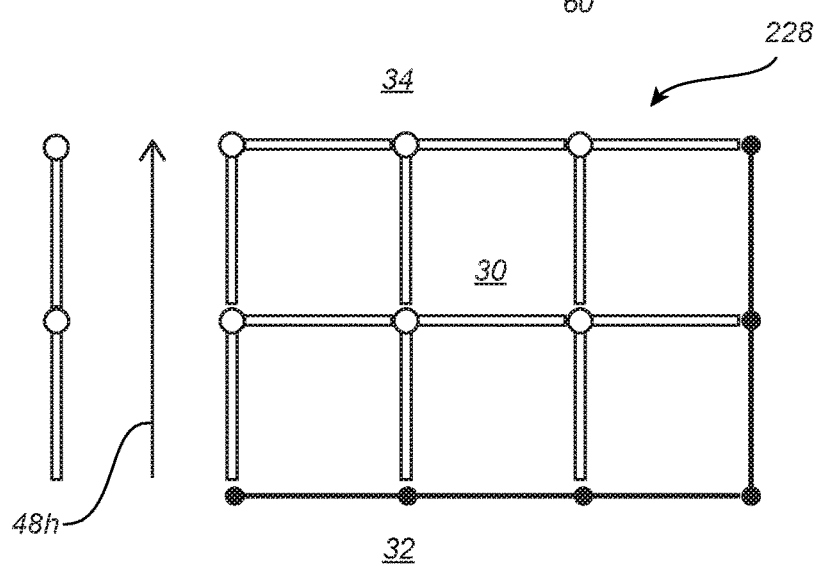
FIG. 10B is a plan view of the queue management system of FIG. 10A, wherein the dynamic pedestrian barriers have been operated to a configuration in which they define a first queue path.
Figure 10C:
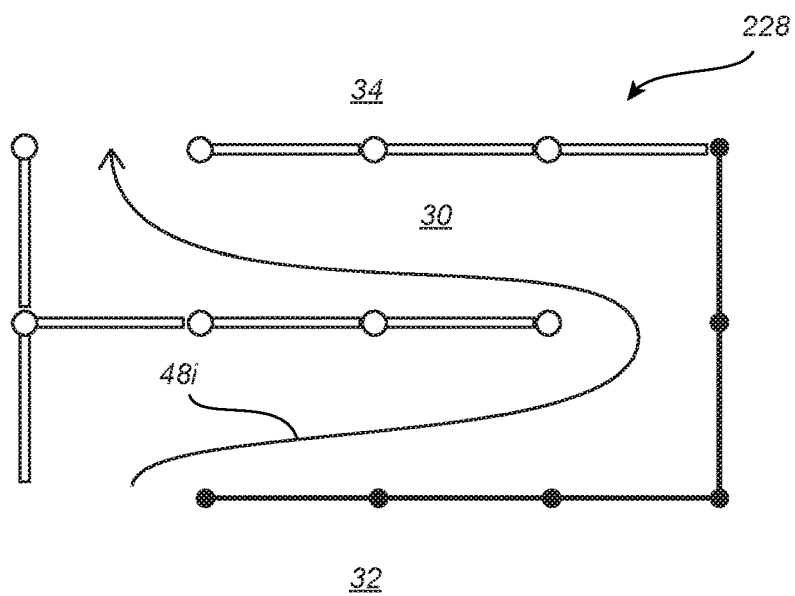
FIG. 10C is a plan view of the queue management system of FIG. 10A, wherein the dynamic pedestrian barriers have been operated to a configuration in which they define a second queue path.

FIG. 10B illustrates the queue management system 228 with the barrier arms 14*a-b* of the dynamic pedestrian barriers 210 positioned in a first configuration, in which the plurality of dynamic pedestrian barriers 210 define a first queue path 48h between a queue entry 32 and a queue exit 34, the first queue path 48h having a first path length. If the controller (not illustrated), e.g. based on images of the queuing area 30, determines that the number of people in the queue increases above a threshold, the controller may control a subset of the dynamic pedestrian barriers 210 to move their respective barrier arms 14a-b (FIG. 5) to define another queue path which is better adapted for the number of people in the queue. FIG. 10C illustrates the barrier arms 14a-b of the dynamic pedestrian barriers 210 in a second configuration, in which the plurality of dynamic pedestrian barriers 210 define a second queue path 48i between the queue entry 32 and the queue exit 34, the second queue path 48i having a second path length which is longer than the first path length 48h illustrated in FIG. 10B.

Figure 11A:
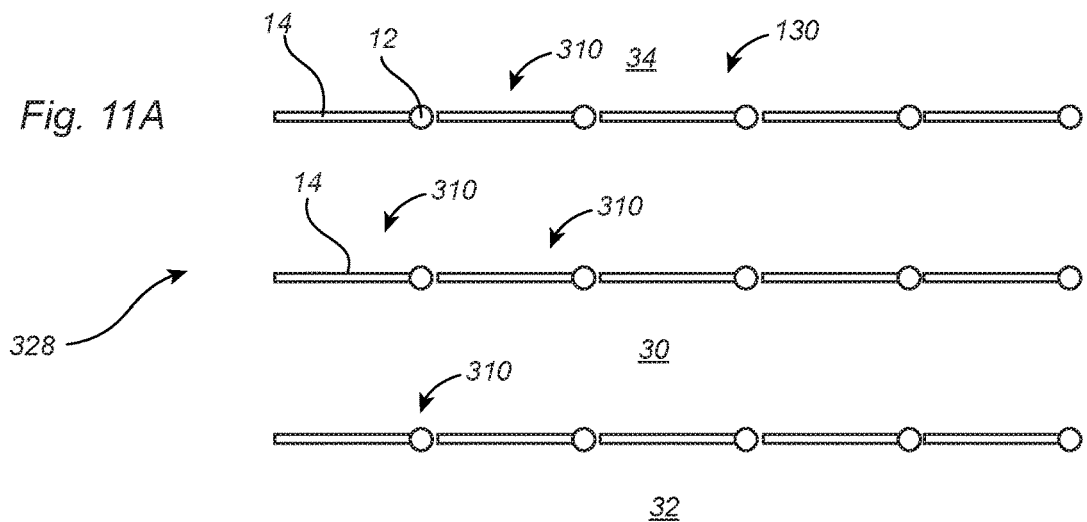
FIG. 11A is a plan view of a queue management system according to a fourth embodiment, the queue management system comprising multiple instances of the dynamic pedestrian barrier of FIG. 6.

FIG. 11A illustrates a fourth embodiment of a queue management system 328 as seen from above. The queue management system 328 comprises a plurality of dynamic pedestrian barriers 310 of the type described with reference to FIG. 6, which are again arranged in a grid of rows and columns. In the view of FIG. 11A, the barrier arms 14 of all dynamic pedestrian barriers 310 point in the same direction, and block the passage from the queue entry 32 to the queue exit 34.

Figure 11B:
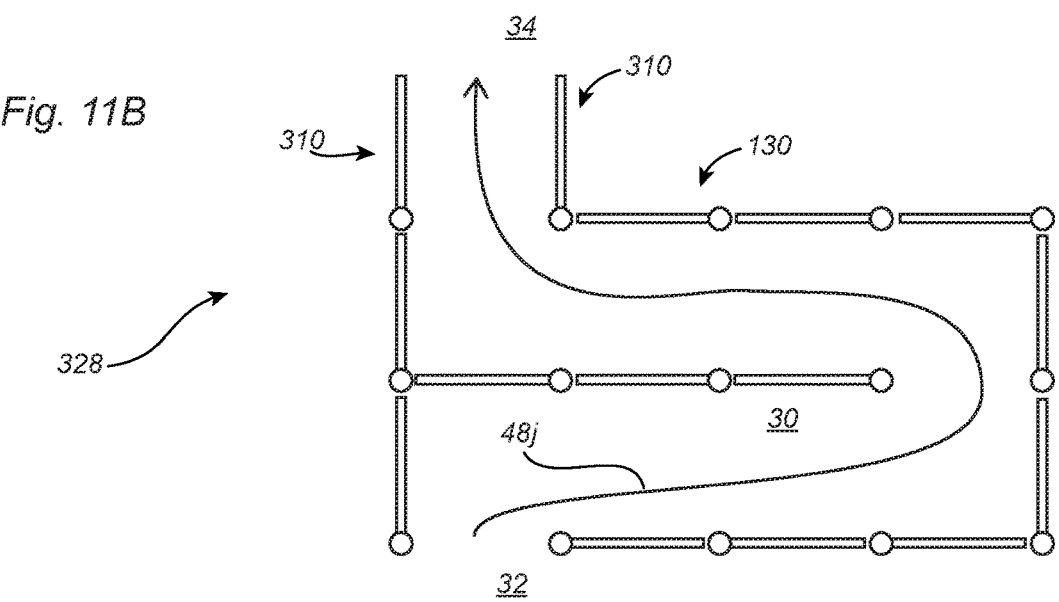
FIG. 11B is a plan view of the queue management system of FIG. 11A, wherein the dynamic pedestrian barriers have been operated to a configuration in which they define a first queue path.

FIG. 11B illustrates the queue management system 328 with the barrier arms 14 of the dynamic pedestrian barriers 310 positioned in a first configuration, in which the plurality of dynamic pedestrian barriers 310 define a first queue path 48j between a queue entry 32 and a queue exit 34.

Figure 11C:
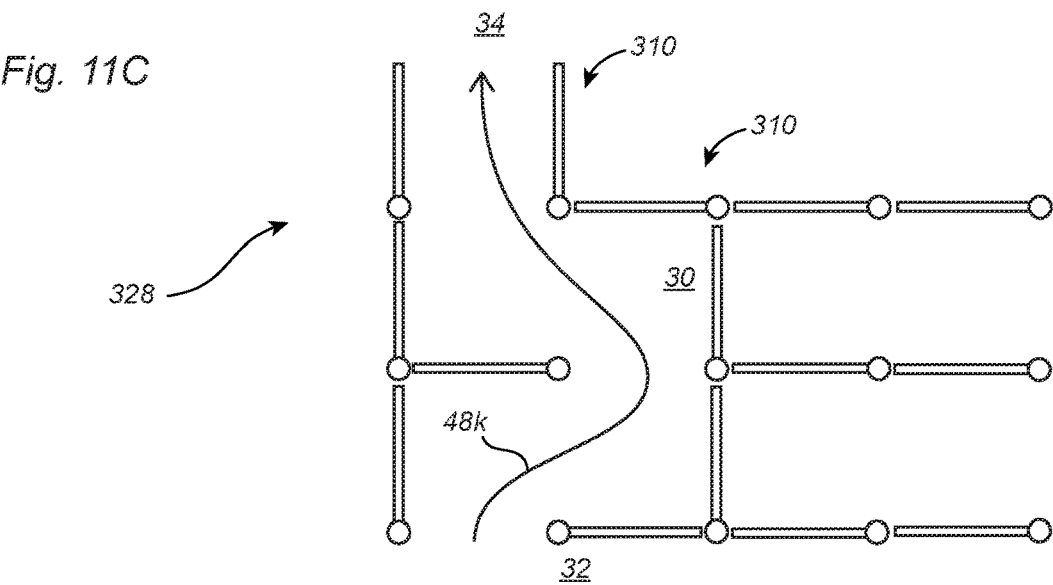
FIG. 11C is a plan view of the queue management system of FIG. 11A, wherein the dynamic pedestrian barriers have been operated to a configuration in which they define a second queue path.

In the view of FIG. 11C, a subset of the dynamic pedestrian barriers 310 have been rotated, each about a respective turning axis A concentric with the barrier post 12 (FIG. 6), such that the dynamic pedestrian barriers 310 in FIG. 11C are in a second configuration where they define a second queue path 48k between the queue entry 32 and the queue exit 34, the second queue path 48k being shorter than the first path 48j of FIG. 11B.

FIG. 12A illustrates a fifth embodiment of a queue management system 428 as seen from above. The queue management system 428 comprises a plurality of dynamic pedestrian barriers 410 of the type described with reference to FIG. 7, which are again arranged in a grid of rows and columns. The grid of FIG. 12A however differs from the grids described hereinbefore in that the pattern formed by the dynamic pedestrian barriers 410 of FIG. 12A when their barrier arms 14a-c are extended is not rectilinear; instead, the barrier arms 14a-c of each dynamic pedestrian barrier 410 stretch in three directions separated by 120°, towards the barrier arms of three neighbouring dynamic pedestrian barriers, to define a honeycomb pattern. FIG. 12A illustrates the dynamic pedestrian barriers 410 with their respective barrier arms 14a-c (FIG. 7) in extended position.

FIG. 12B illustrates the queue management system 428 with the barrier arms 14a-c of the dynamic pedestrian barriers 410 positioned in a first configuration, in which the plurality of dynamic pedestrian barriers 410 define a first queue path 48m between a queue entry 32 and a queue exit 34.

In the view of FIG. 12C, a subset of the barrier arms 14a-c (FIG. 7) of the dynamic pedestrian barriers 410 have been operated to define a second queue path 48n and a third queue path 48p between the queue entry 32 and the queue exit 34.

FIG. 13 illustrates a sixth embodiment of a queue management system 528, wherein dynamic pedestrian barriers 410 of the type described with reference to FIG. 7 are arranged in a grid structure which is different from that of FIGS. 12A-C.

Figure 14:
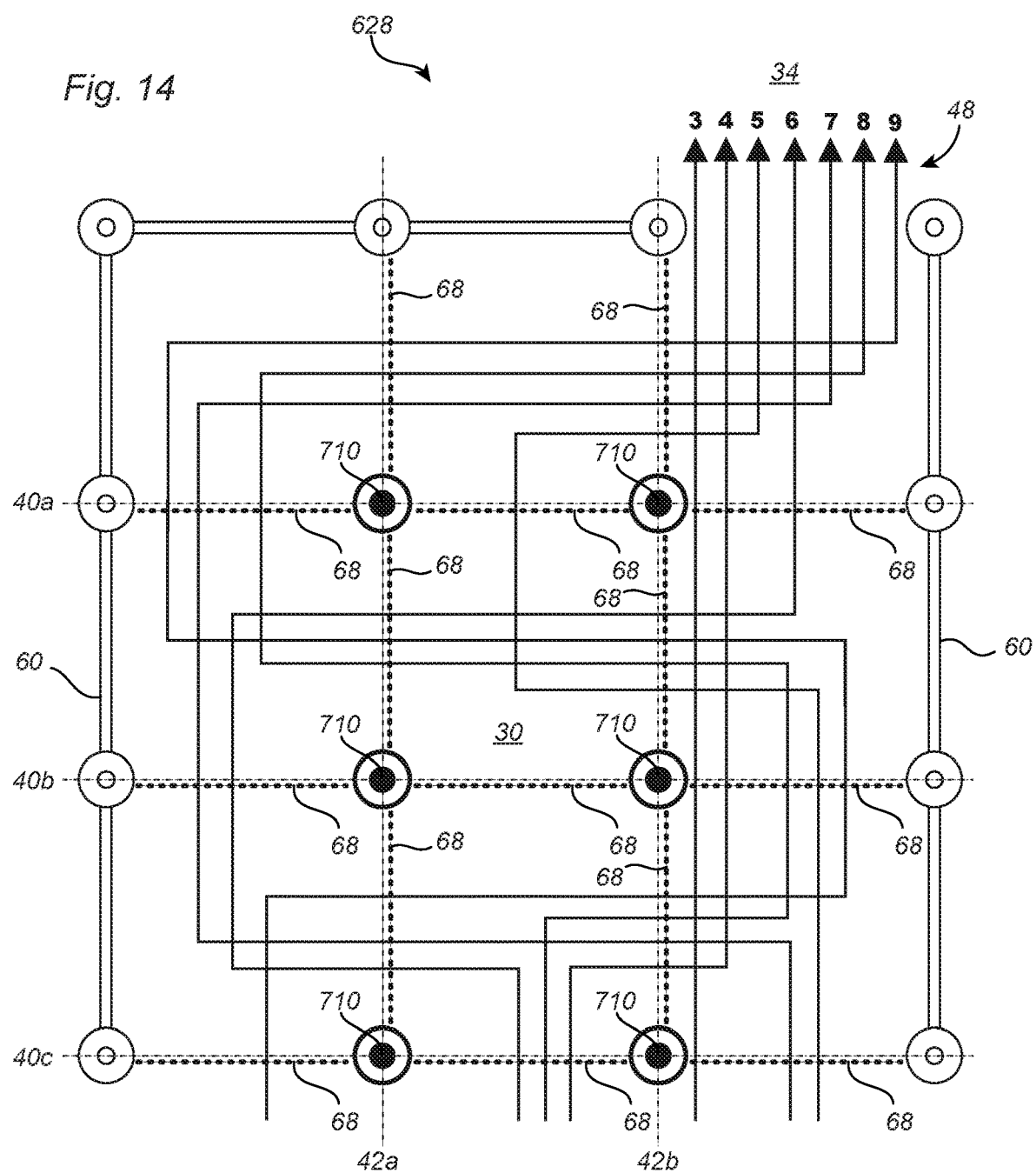
FIG. 14 is a plan view of a queue management system according to a seventh embodiment, the queue management system comprising a plurality of dynamic pedestrian barriers arranged in a grid.

FIG. 14 illustrates a seventh embodiment of a queue management system 628, wherein dynamic pedestrian barriers 710 are arranged in a rectilinear grid. The grid comprises three rows 40a-c of dynamic pedestrian barriers 710 arranged in two columns 42a-b. The dynamic pedestrian barriers 710 are partly enclosed by static pedestrian barriers 60. The dynamic pedestrian barriers 710 may be of any type able to open and close a passage 68 between each respective dynamic pedestrian barrier 710 and any adjacent dynamic or static barrier positioned along the rows and columns of said grid. The selectably openable and closable passages 68 are illustrated in FIG. 14 by dotted lines. Thanks to dynamic pedestrian barriers' 710 ability to open and close all passages 68 within said grid, a total freedom of defining arbitrary paths through the grid is obtained. In the illustrated example, seven exemplary paths 48 are illustrated, each having a path length differing from the other exemplary paths. The seven paths 48 have respective path lengths of 3, 4, 5, 6, 7, 8 and 9 times the side of the grid unit cell, respectively. Hence, using a grid of only two by three dynamic pedestrian barriers, seven different path lengths uniformly distributed within the obtainable path length range, may be obtained.

Figure 15:
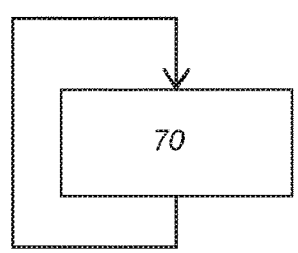
FIG. 15 is a flow chart illustrating a method of operating a queue management system.

The flow chart of FIG. 15 illustrates a method of enforcing a queue path to a pedestrian queue extending in a queuing area between a queue entry and a queue exit using any of the above described queue management systems 28, 128, 228, 328, 428, 528, 628. The method comprises operating, in step 70, a plurality of dynamic pedestrian barriers, each dynamic pedestrian barrier comprising at least one movable barrier arm carried by a barrier post, the plurality of dynamic pedestrian barriers being arranged in a two-dimensional grid pattern over the queuing area. The method may be iterated repeatedly.

Hereinabove, several different dynamic pedestrian barriers 10, 201, 310, 410, 510, 610, 710 have been described. Many variations are possible. For example, the barrier arms of the dynamic pedestrian barriers may be moved by motors which may be electrical, pneumatic, hydraulic, or a combination of those. Some embodiments of the dynamic pedestrian barriers may be hidden underneath the floor in retracted position, and raised to a position above ground when moving the respective barrier arm(s) to an extended position in which they define the shape of a queue. The dynamic pedestrian barriers may invoke security features such as warning lights, warning sound emitters, or touch sensible arms, when operating. The dynamic pedestrian barrier can be portable/removable, or permanently fixed to the ground. Power can be supplied to the dynamic pedestrian barriers via a wired connection to a power distribution grid; alternatively, they may be battery powered. The control interface of the dynamic pedestrian barriers for receiving control signals may be wireless or wired; moreover, the dynamic pedestrian barriers may be supplemented with a manual control interface, wherein the access to a manual control mode may require authentication. The dynamic pedestrian barrier may conveniently be a lightweight construction in a field of application where the queuing persons can be expected to co-operate with the queue line shape enforcement system, ora strict queue line shape retention is not required. In such a case, the passage at the given transit point is preferably obstructed or allowed by only one arm. Alternatively, the dynamic pedestrian barrier may be a reinforced structure in a field of application where the queuing persons are not necessarily in all cases cooperating with the system of enforcing the shape of the queue line, and the system is required to force the persons into the defined queue shape. In such a case, the passage at the given transit point may be obstructed or allowed by a plurality of barrier arms or a barrier gate, wherein these dynamic pedestrian barriers can intermesh with, or automatically attach to, adjacent dynamic pedestrian barriers when closed.

Similarly, several queue management systems 28, 128, 228, 328, 428, 528, 628 have been described, and many variations thereof are possible. By way of example, a camera is not necessary for controlling the queue management system. The controller may be configured to reconfigure the dynamic pedestrian barriers to form different queue paths based on e.g. a fixed schedule, or based on manual control, without any input with regard to the number of people in the queue. Alternatively, other pedestrian detectors may be employed, such as presence detectors, or beams of light that are broken each time a pedestrian passes into the queue. Moreover, grids of identical dynamic pedestrian barriers have been described. However, dynamic pedestrian barrier grids may be formed by mixing dynamic pedestrian barriers of different types.

The invention has mainly been described above with reference to a few embodiments. However, as is readily appreciated by a person skilled in the art, other embodiments than the ones disclosed above are equally possible within the scope of the invention, as defined by the appended patent claims. In the claims, the word "comprising" does not exclude other elements or steps, and the indefinite article "a" or "an" does not exclude a plurality.

What is claimed is:

1. A queue management system for managing a queue extending in a queuing area between a queue entry and a queue exit, the queue management system comprising:
   at least one camera;
   a plurality of dynamic pedestrian barriers, each dynamic pedestrian barrier comprising at least one movable barrier arm carried by a barrier post, the plurality of dynamic pedestrian barriers being arranged in a two-dimensional grid pattern over the queuing area; and
   a controller configured to operate each movable barrier arm of the plurality of dynamic pedestrian barriers, and to obtain, based on image data from said at least one camera, a model of the plurality of dynamic pedestrian barriers and the plurality of moveable barrier arms, the model including a representation of selectably openable and closable passages between dynamic pedestrian barriers, wherein the controller is further configured to control the movable barrier arms of the plurality of dynamic pedestrian barriers to be reconfigurable between at least:
      a first configuration, in which the plurality of dynamic pedestrian barriers define a first queue path between the queue entry and the queue exit, the first queue path having a first path length, and
      a second configuration, in which the plurality of dynamic pedestrian barriers define a second queue path between the queue entry and the queue exit, the second queue path having a second path length different from said first path length.

2. The queue management system according to claim 1, wherein each dynamic pedestrian barrier of said plurality of dynamic pedestrian barriers comprises a single barrier arm turnable about a vertical axis.

3. The queue management system according to claim 1, wherein said plurality of dynamic pedestrian barriers each comprise a vertical barrier post, a control interface and a plurality of motorized barrier arms carried by said barrier post, each barrier arm of said plurality of barrier arms being movable by a motor between an extended position, in which the barrier arm extends horizontally from the barrier post to block a pedestrian path, and a retracted position, in which the barrier arm is held within or adjacent to the barrier post, wherein each barrier arm of said plurality of barrier arms is individually controllable via said control interface so as to be individually movable between its respective extended and retracted positions, and wherein said plurality of barrier arms are configured to extend, when in their respective extended positions, in different directions from the barrier post.

4. The queue management system according to claim 1, further comprising a pedestrian detector configured to detect a number of pedestrians within the queuing area, wherein the controller is further configured to control the plurality of barriers based on the detected number of pedestrians.

5. The queue management system according to claim 4, wherein the pedestrian detector comprises the at least one camera, and the controller is configured to:
   obtain, based on image data from said at least one camera, queue data representing a present and/or predicted queue length; and
   control, based on said queue data, said plurality of dynamic pedestrian barriers to form a queue path adapted for said queue length.

6. The queue management system according to claim 1, wherein the controller is configured to control the plurality of dynamic pedestrian barriers to be configurable between at least three different configurations, each of said configurations defining a queue path having a path length different from the other of said at least three different configurations.

7. The queue management system according to claim 1, wherein at least two dynamic pedestrian barriers of said plurality of dynamic pedestrian barriers are arranged next to each other, such that a passage between said at least two dynamic pedestrian barriers is arranged to be selectably opened or closed by operating a movable arm of at least one of the two dynamic pedestrian barriers.

8. The queue management system according to claim 1, comprising at least two adjacent rows of dynamic pedestrian barriers, each row comprising at least three dynamic pedestrian barriers.

9. A queue management system for managing a queue extending in a queuing area between a queue entry and a queue exit, the queue management system comprising:
   a plurality of dynamic pedestrian barriers, each dynamic pedestrian barrier comprising at least one movable barrier arm carried by a barrier post, the plurality of dynamic pedestrian barriers being arranged in a two-dimensional grid pattern over the queuing area, wherein the dynamic pedestrian barriers are arranged, as seen from above, in a plurality of rows and columns, wherein the dynamic pedestrian barriers of at least one row are offset from the dynamic pedestrian barriers of at least two other rows, such that the dynamic pedestrian barriers of said at least one row are offset from dynamic pedestrian barrier columns defined by the dynamic pedestrian barriers of said at least two other rows; and
   a controller configured to control the movable barrier arms of the plurality of dynamic Pedestrian barriers to be reconfigurable between at least:
      a first configuration, in which the plurality of dynamic pedestrian barriers define a first queue path between the queue entry and the queue exit, the first queue path having a first path length, and a second configuration, in which the plurality of dynamic pedestrian barriers define a second queue path between the queue entry and the queue exit, the second queue path having a second path length different from said first path length.

10. The queue management system according to claim 9, wherein at least one row of dynamic pedestrian barriers comprises at least one dynamic pedestrian barrier provided with four movable barrier arms.

11. The queue management system according to claim 9, wherein the controller is configured to control the plurality of dynamic pedestrian barriers to be configurable between at least three different configurations, each of said configurations defining a queue path having a path length different from the other of said at least three different configurations.

12. The queue management system according to claim 9, wherein at least two dynamic pedestrian barriers of said plurality of dynamic pedestrian barriers are arranged next to each other, such that a passage between said at least two dynamic pedestrian barriers is arranged to be selectably opened or closed by operating a movable arm of at least one of the two dynamic pedestrian barriers.

13. The queue management system according to claim 9, comprising at least two adjacent rows of dynamic pedestrian barriers, each row comprising at least three dynamic pedestrian barriers.

14. The queue management system according to claim 9, further comprising a pedestrian detector configured to detect a number of pedestrians within the queuing area, wherein the controller is further configured to control the plurality of barriers based on the detected number of pedestrians.

15. The queue management system according to claim 14, wherein the pedestrian detector comprises a camera, and the controller is configured to:
obtain, based on image data from said at least one camera, queue data representing a present and/or predicted queue length; and
control, based on said queue data, said plurality of dynamic pedestrian barriers to form a queue path adapted for said queue length.

16. The queue management system according to claim 9, wherein at least one dynamic pedestrian barrier of the plurality of dynamic pedestrian barriers comprises of four motorized barrier arms that are independently moveable and controllable.

17. A queue management system for managing a queue extending in a queuing area between a queue entry and a queue exit, the queue management system comprising:
a plurality of dynamic pedestrian barriers, each dynamic pedestrian barrier comprising at least one movable barrier arm carried by a barrier post, the plurality of dynamic pedestrian barriers being arranged in a two-dimensional pattern over the queuing area; and a controller configured to control the movable barrier arms of the plurality of dynamic pedestrian barriers to be reconfigurable between at least
a first configuration, in which the plurality of dynamic pedestrian barriers define a first number of queue paths, each queue path extending between a respective queue entry and a respective queue exit; and
a second configuration, in which the plurality of dynamic pedestrian barriers defines a second number of queue paths, each queue path extending between a respective queue entry and a respective queue exit, wherein said second number of queue paths is different from said first number of queue paths.

18. The queue management system according to claim 17, wherein at least one of the dynamic pedestrian barriers comprises:
a plurality of barrier arms carried by said barrier post, each barrier arm of said plurality of barrier arms being movable by a motor between an extended position, in which the barrier arm extends horizontally from the barrier post, and a retracted position, in which the barrier arm is held within or adjacent to the barrier post, wherein each barrier arm of said plurality of barrier arms is individually controllable so as to be individually movable between its respective extended and retracted positions, and wherein said plurality of barrier arms are configured to extend, when in their respective extended positions, in different directions from the barrier post.

19. The queue management system according to claim 17, wherein the controller is configured to control the plurality of dynamic pedestrian barriers to be configurable between at least two different queue path configurations, each of said queue path configurations defining a queue path having a path length different from the other of said at least two different que path configurations configurations.

20. The queue management system according to claim 17, wherein at least two dynamic pedestrian barriers of said plurality of dynamic pedestrian barriers are arranged next to each other, such that a passage between said at least two dynamic pedestrian barriers is arranged to be selectably opened or closed by operating a movable arm of at least one of the two dynamic pedestrian barriers.

21. The queue management system according to claim 17, wherein at least one movable barrier arm of at least one dynamic pedestrian barrier is telescopic, allowing a length of the movable barrier arm to be changed.

22. The queue management system according to claim 21, wherein the at least one movable barrier arm that is telescopic comprises at least two telescopic segments interconnected by a prismatic joint.

23. The queue management system according to claim 17, wherein at least one movable barrier arm is moveable with at least two degrees of freedom.

* * * * *